United States Patent [19]
Leslie et al.

[11] Patent Number: 5,778,354
[45] Date of Patent: Jul. 7, 1998

[54] DATABASE MANAGEMENT SYSTEM WITH IMPROVED INDEXED ACCESSING

[75] Inventors: Harry A. Leslie, Los Altos Hills; David W. Birdsall, Santa Clara, both of Calif.; Rohit N. Jain, Rochester Hills, Mich.; Hedieh Yaghmai, San Jose, Calif.

[73] Assignee: Tandem Computers Incorporated, Cupertino, Calif.

[21] Appl. No.: 481,649

[22] Filed: Jun. 7, 1995

[51] Int. Cl.$^6$ .................................................. G06F 17/30
[52] U.S. Cl. ........................ 707/2; 707/3; 395/182.02; 395/200.03; 395/709; 395/705
[58] Field of Search ................................ 395/602, 603, 395/182.02, 200.03, 709, 705; 707/2, 3

[56] References Cited

U.S. PATENT DOCUMENTS

| | | | |
|---|---|---|---|
| 4,497,039 | 1/1985 | Kitakami et al. | 364/900 |
| 4,506,326 | 3/1985 | Shaw et al. | 364/300 |
| 4,967,341 | 10/1990 | Yamamoto et al. | 364/200 |
| 5,043,872 | 8/1991 | Cheng et al. | 364/200 |
| 5,519,859 | 5/1996 | Grace | 395/600 |
| 5,551,031 | 8/1996 | Cheng et al. | 395/600 |
| 5,557,791 | 9/1996 | Cheng et al. | 395/600 |
| 5,559,948 | 9/1996 | Bloomfield et al. | 395/159 |
| 5,560,006 | 9/1996 | Layden et al. | 395/600 |
| 5,560,007 | 9/1996 | Thai | 395/600 |

OTHER PUBLICATIONS

Sartori et al. "Partial Indexing for Nonuniform Data Distributions in Relational DBMS's". IEEE Transaction vol. 6, No. 3, pp. 420–429, Jun. 1994.

IBM Corp., technical Disclosure Bulletin, "Query optimization for relational accessing language", vol. 28, No. 8, pp. 3471–3471, Jan. 1986.

Pang et al., "An effiencient semantic query optimization algorithm," Proceeding of the Interl conf on Data Engineering, Kobe, JP, No. 7, IEEE, pp. 326–335, Apr. 1991.

Bayer, R. and Schkolnick, M. "Concurrency of Operations of B–Trees" Acta.Inf. 9 1 (1977).

Bayer, R. and Unterauer, K. "Prefix B–Trees" ACM–TODS, vol. 2, No. 1, Mar. 1977.

Beckmann, N. and Kreigel, H.P. and Schneider, R. and Seeger, "The R*–tree: an Efficient and Robust Access Method for Points and Rectangles". ACM–SIGMOD 1990.

Bentley J. L. "Multidimensional Binary Search Trees Used for Associative Searching" Comm. ACM, vol. 18, No. 9, 1975.

Chang J. M. and Fu K. S. "A Dynamic Clustering Technique for Physical Database Design" ACM–SIGMOD 1980.

(List continued on next page.)

*Primary Examiner*—Wayne Amsbury
*Assistant Examiner*—Jean M. Corrielus
*Attorney, Agent, or Firm*—Graham & James LLP

[57] ABSTRACT

A database management system (DBMS) provided with a multi-dimensional improved indexed accessing capability using keyed index searching. Individual search keys are constructed from general expression statements created in the DBMS compiler from search queries supplied to the DBMS. Each key column represents another dimension, and both ranges and IN lists can be specified in the search query and used as the predicate values in multiple columns. Missing predicate values in the search query are interpreted as a specification of the minimum and maximum values for the associated search key column. During compile time, the DBMS compiler produces general expressions to be used by the DBMS executor during run time to create the search keys. The DBMS compiler evaluates search queries by associating predicates with clusters and disjunct numbers assigned to each individual disjunct in the search query expression. The DBMS executor uses the general expression from the compiler and eliminates any conflicts among same column predicates, removes redundancies in predicate values and disjuncts and reduces the number of records to be accessed to the minimum required to complete the search query. The individual search keys are generated in the same order as the index to which the search pertains (i.e., increasing or decreasing order).

18 Claims, 7 Drawing Sheets

OTHER PUBLICATIONS

Comer, D. "The ubiquitous B-tree" ACM Computing Surveys vol. 11, No. 2, 1979.

Guttmann, A. "R-trees: a dynamic index structure for spatial searching" Proceedings ACM-SIGMOD Conf., 1984.

Held, G and Stonebraker, M "B-Trees Re-examined" Electronics Research Laboratory, University of California, 1975.

Knuth, D.E. "The Art of Computer Programming" vol. 3, Sorting and Searching. Addison-Wesley, Reading, Mass., 1973.

Lomet, D.B. and Salzberg, B. "The hB-tree: a Robust Multi-Attribute Indexing Method" ACM Trans. on Database Systems, vol. 15, No. 4 1989.

Nievergelt, J and Hinterberger, H "The Grid File: An Adaptable, Symmetric Multikey File Structure" Trends in Information Processing Systems, Proc 3rd ECI Conference 1981.

Robinson, J.T. "The K-D-B-Tree: A Search Structure for Large Multi-dimensional Dynamic Indexes" Proc. ACM SIGMOD Conf. 1981.

Rothnie, J. B. and Lozano, T. "Attribute Based File Organization in a Paged Memory Environment" comm ACM, vol. 17, No. 2, Nov. 1974.

Seeger, B. and Kriegel, H. P. "The Buddy-tree: an Efficient and Robust Access Method for Spatial Data Base Systems" Proc. 16th Int. Conf. on Very Large Data Bases, 1990.

Sellis, T. and Rossopoulous, N. and Faloutsos, C. "The R+ Tree: a Dynamic Index for Multidimensional Objects" Proc. 13th Int. Conf. on Very Large Data Bases, 1987.

Snodgrass, R. "Temporal Databases" Computer, pp. 35–42, Computer Sep. 1986.

IBM Corp., IBM Technical Disclosure Bulletin, "Optimization of Like Predicate in an SQL Query", vol. 35, No. 4A, Sep. 1992, pp. 314–317.

IBM Corp., IBM Technical Disclosure Bulletin, "Query Optimization for Relational Accessing Language", vol. 28, No. 8, Jan. 1986, pp. 3471–3472.

Proceedings of the International Conference on Data Engineering, KOBE, JP, Apr. 8–12, 1991, No. 7, IEEE, Hwee Hwa Pang et al., "An Efficient Semantic Query Optimization Algorithm," pp. 326–335.

DATABASE MANAGEMENT SYSTEM WITH IMPROVED INDEXED ACCESSING

BACKGROUND OF THE INVENTION

This invention relates generally to relational database management systems, and particularly to a relational database management system with improved indexed accessing.

Most relational database management systems (DBMS) use B-Trees to allow users to perform queries on large databases or tables using appropriate commands, such as SQL (structured query language) commands. A B-Tree is an index residing in the database memory and having one or more columns, with each column representing another dimension in the index. B-Trees permit searching for records in a database using one or more keys specified by users by means of appropriate query commands. Because the keys define a subset of an entire table of records, indexed searching can eliminate the need to search through the entire table of records in order to retrieve a much smaller subset of such records pertinent to the user query.

Ideally, for most queries, indexed accessing enables the pertinent records to be accessed at minimum transactional cost (the cost being measured by an appropriate parameter, such as the equivalent number of secondary storage accesses as required to complete the query). However, many user queries presented to a DBMS using a B-Tree index structure cannot be processed using an indexed access technique. In such cases, the entire table of records must be searched, which is time consuming and relatively inefficient. In addition, the extent to which the total number of records required to be searched can be reduced is severely limited in a B-Tree index structure by virtue of the constraint that only one key column in an index can be used to specify a range of values or a specific list of values (termed an IN list). For example, consider a table T having columns (a, b, c, d, e, f, g) and a corresponding index I having columns (a, b, c, d). A user query requesting that the DBMS select all records for the predicates:

where $a=10$
and b between 20 and 30
and $c=40$
and $d=50$ would result in begin-end keys of the form:

begin key: $a=10$, $b>=20$
end key: $a=10$, $b<=30$

Even though the predicates specify $c=40$ and $d=50$, these two equality predicates on key columns c and d are not incorporated in the search key due to the range on b. As a result, a search in the index for records conforming to the predicates will be able to seek to the nearest (a, b) pair, but cannot position precisely on the desired (a, b, c, d) values. Stated differently, all of the c and d values in the index must be examined and compared with the specific c and d values desired. Depending on the number of records in the c and d columns, the length of time required to perform the index search (and thus the cost), at best, is greater than optimal.

Another disadvantage with existing B-Tree index structures is the constraint imposed when a key column predicate is missing (unspecified). For example, consider the predicates:

where $a=10$
and $c=40$
and $d=50$

The begin-end key constructed by the traditional key building method is as follows:

begin key: $a=10$
end key: $a=10$

In this case, the absence of a predicate on column b prevents the predicates on columns c and d from being used. Consequently, the index table must be searched for all values (b, c, d). A special case occurs when the missing key predicate is on the first column of a partitioning key. For example, consider the predicates:

where $b=30$
and $c=40$
and $d=50$

The traditional key building method cannot construct a search key from these predicates because a predicate on the first column a of the partitioning key is missing. As a result, the query execution plan composed by the DBMS must perform a full table scan.

Still another disadvantage inherent in the B-Tree index structure results when the search query includes an intervening IN predicate. For example, consider the predicates:

where $a=10$
and b in (20, 30)
and $c=40$
and $d=50$

The IN predicate on column b specifies an equality comparison with a set of values. The traditional key building method is capable of dealing with an equality comparison that involves exactly one value, but not a set of values. Consequently, the IN predicate cannot be used in the key. As a result, the search key contains only column a:

begin key: $a=10$
end key: $a=10$

The absence of a usable key predicate on column b prevents the predicates on columns c and d from being used. As a result, a complete search of columns b, c, d must be conducted.

Another disadvantage with existing B-Tree index-based DBMSs results from the mandatory use of the disjunctive normal form for the predicates of the query commands. More particularly, predicates are in disjunctive normal form when only ORs exist at the outer level. For example, consider the query command:

SELECT *
FROM T
WHERE ($a=5$ and ( ($b=1$ and c IN (2,4,9))
  OR ($b=8$ and $c=7$))
  OR (a between 4 and 6 and ( (b between 8 and 10 and c between 6 and 9)
  OR ($b=9$ and $c=11$))

The disjuncts for this expression are:

($a=5$ and $b=1$ and c IN (2,4,9))
OR ($a=5$ and $b=8$ and $c=7$)
OR ($a>=4$ and $a<=6$ and $b>=8$ and $b<=10$ and $c>=6$ and $c<=9$)
OR ($a>=4$ and $a<=6$ and $b=9$ and $c=11$)

In a typical known DBMS, the search for all records pertinent to the query command would begin with the first disjunct. Once all such records have been found, the search would be conducted for all records pertinent to the second disjunct, followed by a search for all records pertinent to the third disjunct, and ending with all records pertinent to the fourth disjunct. This technique is inefficient due to the fact that the single record in the second disjunct is accessed again during the search for records pertinent to the third disjunct. Although the above example requires only one repetitive reading of the same record, in practice relatively large numbers of repetitions occur routinely when accessing records in relatively large databases.

Further compounding the repetitive record problem is the fact that a record cannot be returned twice to a user during an access due to semantic constraints imposed by the system. Consequently, most DBMSs must create a table of records that have been read during an access, which can require a substantial amount of memory space, depending upon the number of records specified by the search query.

This problem of repetitive record accessing is sometimes exacerbated by the appearance of conflicting predicates in a query command. While a user rarely submits a query command with conflicting predicates, the problem can frequently arise when views with hidden predicates are used or when host variables are used in combination with fixed values, or when queries are generated by software. For example, assume the following view exists:

Create view VT as SELECT * from T where b IN (3, 9, 16, 25, 36);

Assume the user query is: SELECT * from VT
WHERE
b between 20 and 30
AND c IN (40, 100, 150)
AND d=50;

In this example, the user has unknowingly required the DBMS to search all values of b in the view lying in the range between 20 and 30, when there is only one value b in the view lying within this range. As a result, all values of b between 20 and 30 will be accessed, resulting in 30 unnecessary records (10 unnecessary b values times 3 c values).

SUMMARY OF THE INVENTION

The invention comprises a method and system for affording improved indexed accessing of records in a relational database management system which is capable of substantially reducing the total number of records accessed in a given search, which permits ranges and IN lists on multiple columns of a search key, which constructs a usable search key in the absence of one or more column values, and which orders the individual columns of the search key in the same manner as the table to which the key pertains.

The invention is carried out by means of a portion of a DBMS compiler termed the Optimizer and a DBMS Executor. The Optimizer is a process component of a DBMS compiler which initially evaluates a search query and generates key expressions for the DBMS Executor. The key expressions describe multi-column keys, including the range and IN list predicates on the individual columns. The Optimizer performs general OR optimization and associates query statement predicates with clusters and disjunct numbers. The use of disjunct numbers in the Optimizer allows the invention to minimize memory space usage for the predicates and disjuncts, since predicates are not repeated: rather, a list of disjunct numbers in which each predicate appears is created. Predicates may share a common set of disjunct numbers. IN lists are treated as a single disjunct to minimize the number of disjuncts.

The DBMS Executor comprises a set of procedures in the DBMS system library that executes compiled query statements against database tables, views or catalogs. The DBMS Executor evaluates the key expressions supplied by the Optimizer portion of the DBMS compiler in order to create a data structure termed a GEM-tree. Each GEM-tree contains information concerning key columns, describing ranges and exact values, predicates defined on each column, comparison operators and other information. The process of building the GEM-tree conducted in the DBMS Executor includes combining ranges and eliminating duplicates on the key columns, while preserving the order in each column (i.e., ascending order or descending order). After a GEM-tree has been constructed by the DBMS Executor, values are retrieved from the tree to build the actual keys for reading data from the required tables.

In the process of constructing the GEM-tree, the DBMS Executor sorts and collapses values from different disjuncts in a column together so that individual records are only read once. This results in a significant saving in the cost of executing a search plan, since all duplicate values are eliminated. Further, the keys are built in such a fashion that the data from each index is read in index order, even when multiple disjuncts are present, which facilitates the accessing of individual records.

The use of disjunct numbers in the DBMS Executor on a per column basis allows the collapse of multiple column disjuncts so that the same record never needs to be read twice. This facilitates the sorting and collapsing of values by the DBMS Executor.

The DBMS Executor also finds the minimum set of all predicates for a disjunct from all predicates for that column in a disjunct. This occurs when there are multiple predicates on a single column which conflict. The minimum set of all predicates is determined by finding the minimum set of values necessary for the combination of predicates. This technique, taken together with the sorting and collapsing of values from different disjuncts ensures that only the minimum amount of data need be read.

In the process of constructing the GEM-tree, the DBMS Executor recognizes missing keys and the specification of ranges and IN lists in the generalized key expressions supplied by the Optimizer portion of the DBMS compiler. This permits a multi-dimensional view of the index, and allows efficient access.

For a fuller understanding of the nature and advantages of the invention, reference should be had to the ensuing detailed description taken in conjunction with the accompanying drawings.

DETAILED DESCRIPTION OF THE PREFERRED EMBODIMENTS

Figure 1:
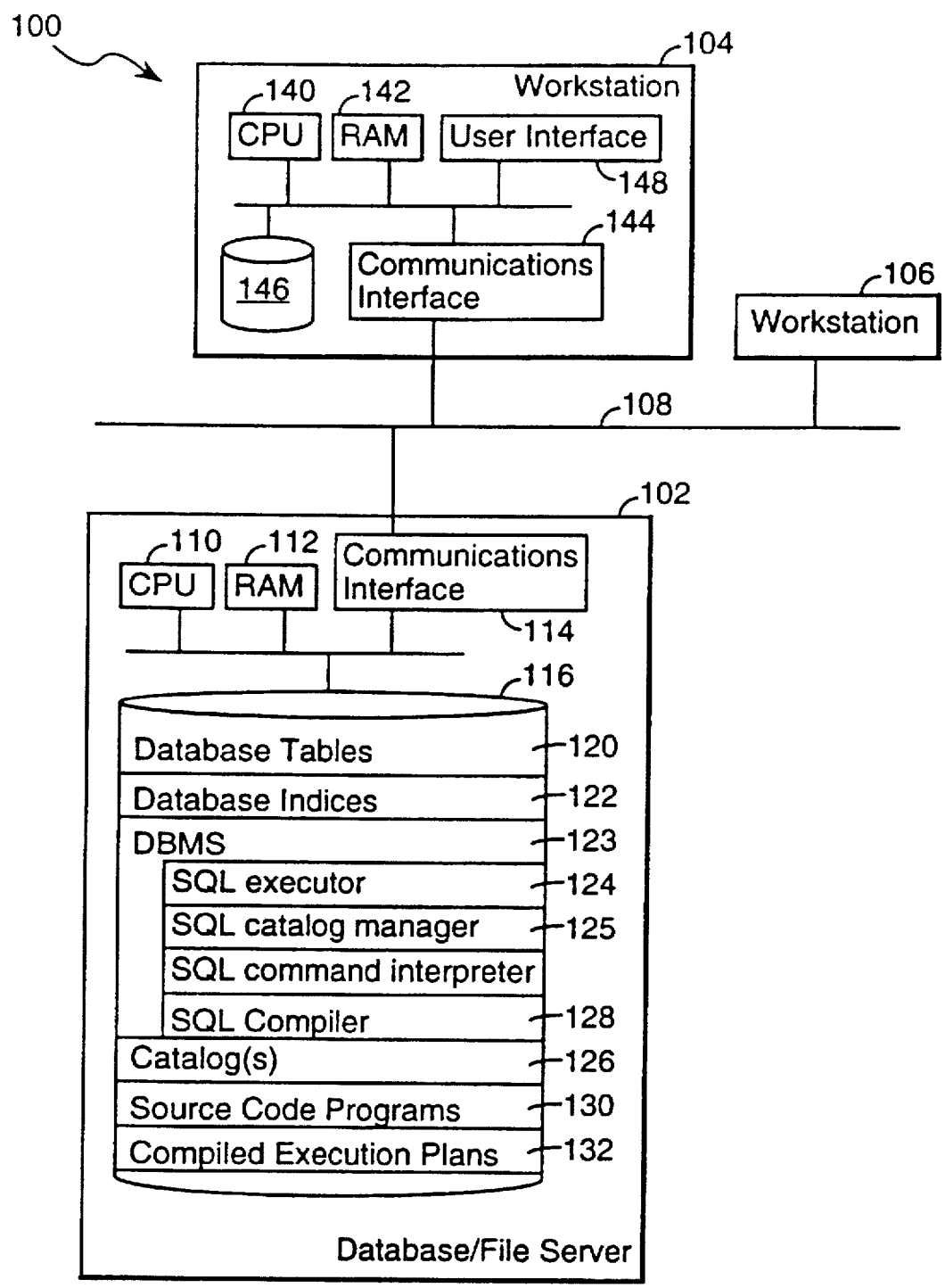
FIG. 1 is a block diagram of a computer system for storing and providing user access to data in stored databases.

Referring to FIG. 1, there is shown a computer system 100 for storing and providing user access to data in stored databases. The system 100 is a distributed computer system having multiple computers 102, 104, 106 interconnected by local area and wide area network communication media 108. The system 100 generally includes at least one database server 102 and many user workstation computers or terminals 104, 106.

When very large databases are stored in a system, the database tables will be partitioned, and different partitions of the database tables will often be stored in different physical disks controlled by different CPUs. However, from the viewpoint of user workstation computers 104, 106, the database server 102 appears to be a single entity. The partitioning of databases is well known to those skilled in the art.

As shown in FIG. 1, the database server 102 includes a central processing unit (CPU) 110, primary memory 112, a communications interface 114 for communicating with user workstations 104, 106 as well as other system resources not relevant here. Secondary memory 116, typically magnetic disc storage, in the database server 102 stores database tables 120, database indices 122, a database management system (DBMS) 123 for enabling user and operator access to the database tables, and one or more catalogs 126 for storing schema information about the database tables 120 as well as directory information for programs used to access the database tables. The DBMS 123 includes a SQL executor 124 as well as other database management subsystems, such as an SQL catalog manager 125 and an SQL command interpreter. The DBMS 123 further includes an SQL compiler 128 for compiling source code database query programs 130 into compiled execution plans 132. The SQL compiler 128 can also be used to compile any specified SQL statement so as to generate an execution plan.

End user workstations 104, 106, typically include a central processing unit (CPU) 140, primary memory 142, a communications interface 144 for communicating with the database server 102 and other system resources, secondary memory 146, and a user interface 148. The user interface 148 typically includes a keyboard and display device, and many include additional resources such as a pointing device and printer. Secondary memory 146 is used for storing computer programs, such as communications software used to access the database server 102. Some end user workstations 106 may be "dumb" terminals that do not include any secondary memory 146, and thus execute only software downloaded into primary memory 142 from a server computer, such as the database server 102 or a file server (not shown).

Glossary

To assist the reader, the following glossary of terms used in this document is provided.

SQL: SQL stands for "Structural Query Language." Most commercial database servers utilize SQL. Any program for accessing data in a database which utilizes SQL is herein called an "SQL Program." Each statement in an SQL program used to access data in a database is called an "SQL statement." An SQL program contains one or more SQL statements.

Execution Plan: An SQL statement which has been compiled into an intermediate form that specifies a method to efficiently access data in a database.

Execution Characteristics: Characteristics of an execution plan that have no effect on its semantics (i.e., operability). Examples are the performance of a plan, and its resource consumption.

Object(s): An object is a file, database table or other encapsulated computer resource accessed by a program as a unitary structure. In the context of the preferred embodiment, objects are database tables. In other implementations of the present invention, objects may be other encapsulated computer resources which the end user accesses indirectly through validated methods (i.e., programs) designated specifically to access those computer resources.

DDL Statement: A data definition language statement. DDL statements are used to create and modify database object (e.g., tables and indices).

DEFINE name: An object handle or link indicating an object to be accessed by an execution plan. An SQL statement may reference objects via a DEFINE names, instead of referencing them directly. This enables the operator to redirect the program to access a different set of objects than the compile-time objects, without having to alter the program, by merely altering the DEFINE names to point to new objects before executing the program.

Source Code Program/Statement: For each execution plan there is a corresponding source code SQL statement. A source code program is the set of SQL statements corresponding to a set of execution plans which together are herein called a "compiled program."

SQL compilation: The act of compiling an SQL statement program or an SQL program. The compilation can be a "static" compilation, performed by invoking an SQL compiler, such as Tandem's® SQLCOMP™, to generate new execution plans for SQL statements in the program. An SQL compilation can also be a dynamic compilation, such as an automatic recompilation initiated due to a program being marked invalid or due to timestamp mismatch between an SQL statement and an object referenced by the statement.

End user: A person using a workstation to access database information in a database server. End users typically do not have the authority to modify the structure of database tables.

Operator: A person using a workstation who has the authority and access rights to modify the structure of database tables and to manually initiate compilation of SQL source code programs.

View: A logical definition of a relation without physical existence. The data presented by a view is derived from a Base Table.

GEM: The acronym for general expression method, the term used to denote the several aspects of the invention.

MDAM: The acronym for multi-dimensional access method, an alternate term for the invention.

Database Server

Figure 2:
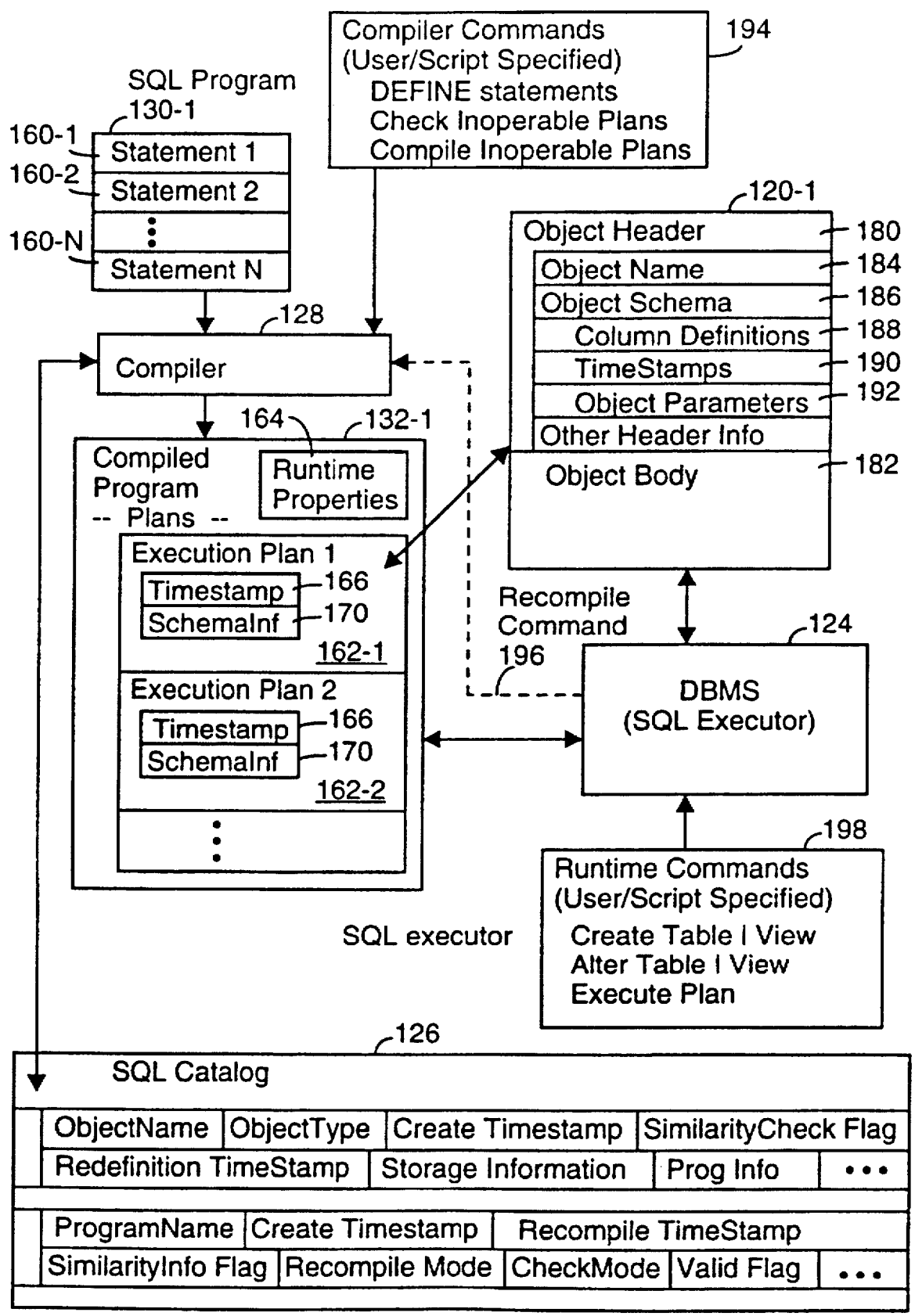
FIG. 2 is a block diagram of data structures stored in a database management system.

FIG. 2 depicts some of the interrelationships between the data structures and programs stored in the database server 102.

A source code program 130-1 includes a sequence of SQL source code statements 160 as well as other non-SQL source code statements (e.g., assignments, and program flow control statements). SQL compiler 128 compiles the SQL source code statements into a compiled program 132-1 having a sequence of compiled statements 162 herein called execution plans. Each source code statements 160 has a corresponding execution plan 162. The compiled 132 program 132 includes a "file label" 164 (i.e., a data structure in the program) that stores a set of runtime properties used by the SQL executor 124, as will be discussed in more detail below. In addition, each execution plan 162 includes, in addition to the compiled query, a timestamp 166 and a set of schema information 170 for each of the database objects to be accessed by that execution plan.

Each database table or object 120 includes a "disk label" 180, herein called an object header, and an object body 182. The object header 180 stores information about the structure, identity and other characteristics of the database object 120, while the object body stores the data content of the database object. The object header 180 includes an object name field 184 and an object schema 186 defining the structure and other characteristics of the data in the database object. The object schema 186 stored in the database object's "disk label" 180 is a compact representation of the catalog information stored for the database table in the SQL catalog 126 and thus includes data attribute definitions 188, timestamps 190 and other object parameters 192.

The catalog 126 is itself a database having a set of tables for storing information about the database objects (e.g., tables and indices) stored in the database server as well as information about the programs stored in the database server. The structure of the catalog 126 will be described in more detail with reference to FIGS. 3 and 4A through 4H.

The compiler 128, as mentioned above, compiles an SQL program 130 into a compiled SQL program 132 having a set of execution plans 162. Operation of the compiler is initiated by either a manually entered compiler command 194 or a recompile command 196 generated by the SQL executor 124 when it attempts to execute an invalid or inoperable execution plan. Manually initiated compilations are governed by user or operator entered commands 194 or, more commonly, user or operator initiated scripts that contain sequences of data definition and compiler commands.

The SQL executor 124 responds to both end user and operator runtime commands 198. Such runtime commands include standard end user initiated plan execution commands, such as to retrieve data from database tables and to add data to database tables. Runtime commands 198 also include DDL statements, for creating database tables and for modifying the structure of existing database tables, although the authority to use these runtime commands 198 is usually restricted to a set of persons herein called operators. For a fuller description of the FIG. 1 system operation, reference may be made to "TANDEM SYSTEMS REVIEW", Vol. 4, No. 2 Jul., 1988, the disclosure of which is hereby incorporated by reference.

Catalog and Disk Label Data Structures

Figure 3:
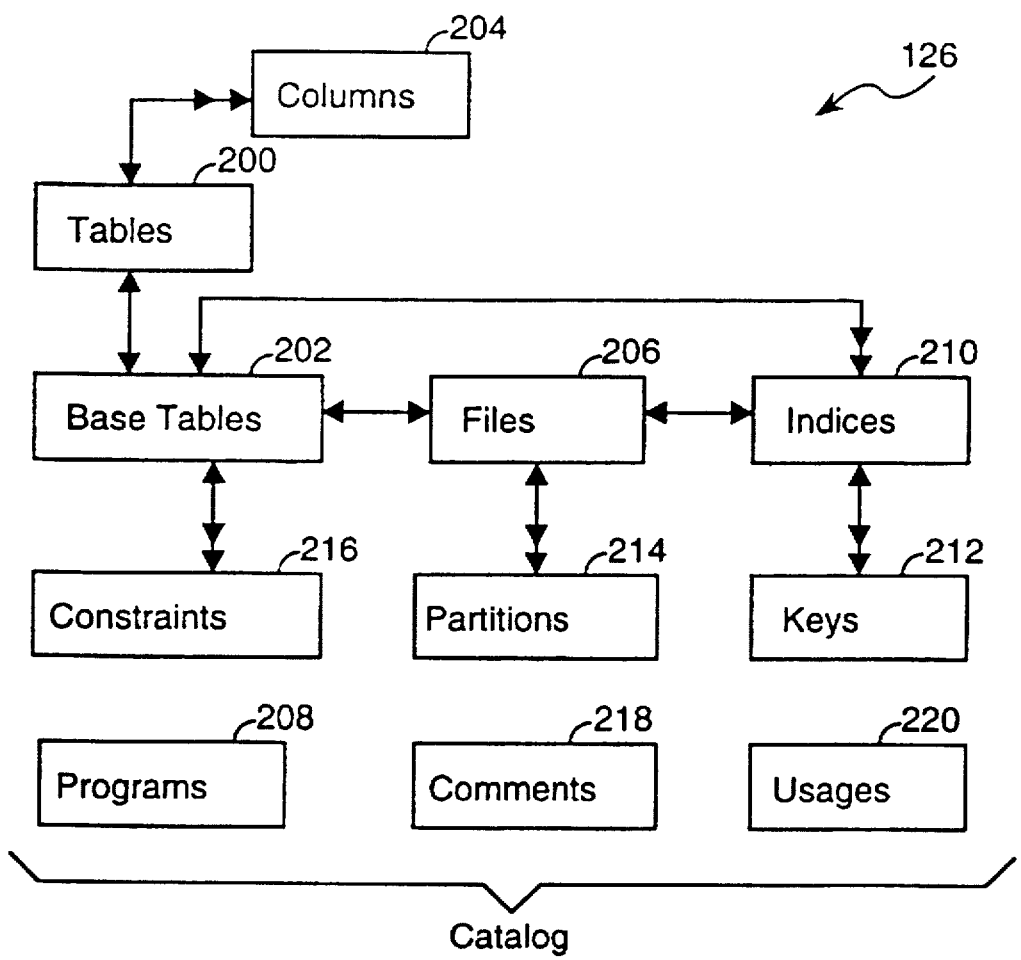
FIG. 3 is a block diagram of the catalog data structure, representing database tables and programs, shown in FIG. 2.

Referring to FIG. 3, the catalog 126 in the preferred embodiment, consists of a set of tables 200–220 representing database tables and programs in a database server or set of database servers.

Figure 4A:
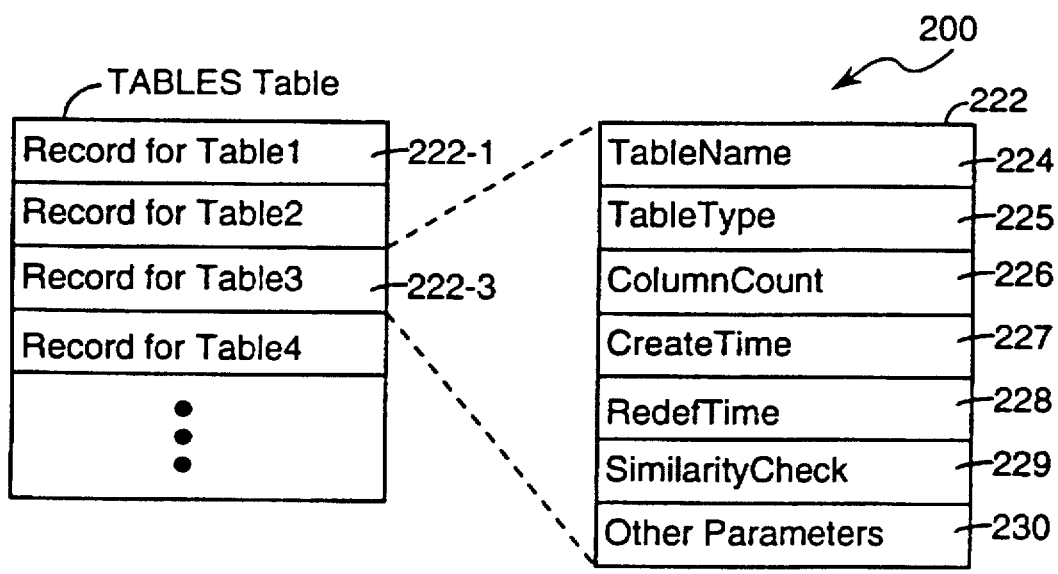
FIGS. 4A-4H are block diagrams representing portions of the tables included in the catalog data structure of FIG. 3.

Referring to FIG. 4A, the "Tables" table 200 includes one record 222 for each database table in the database server. Each record 222 includes the following fields:

TableName 224, denoting the name of the database table;

TableType 225, indicating whether the referenced database table is a true database table or a "view," which is a subset of one or more database tables that are referenced in the same manner as a database table by SQL statements;

ColumnCount 226, indicating the number of distinct columns in the table (or view);

CreateTime 227, is a timestamp value indicating when the table (or view) was first created;

RedefTime 228, is a timestamp value indicating when the table (or view) was last altered;

SimilarityCheck 229, is a flag whose value is Enabled when similarity checks on the table are allowed and is Disabled otherwise; and other parameters 230 not relevant here.

Figure 4B:
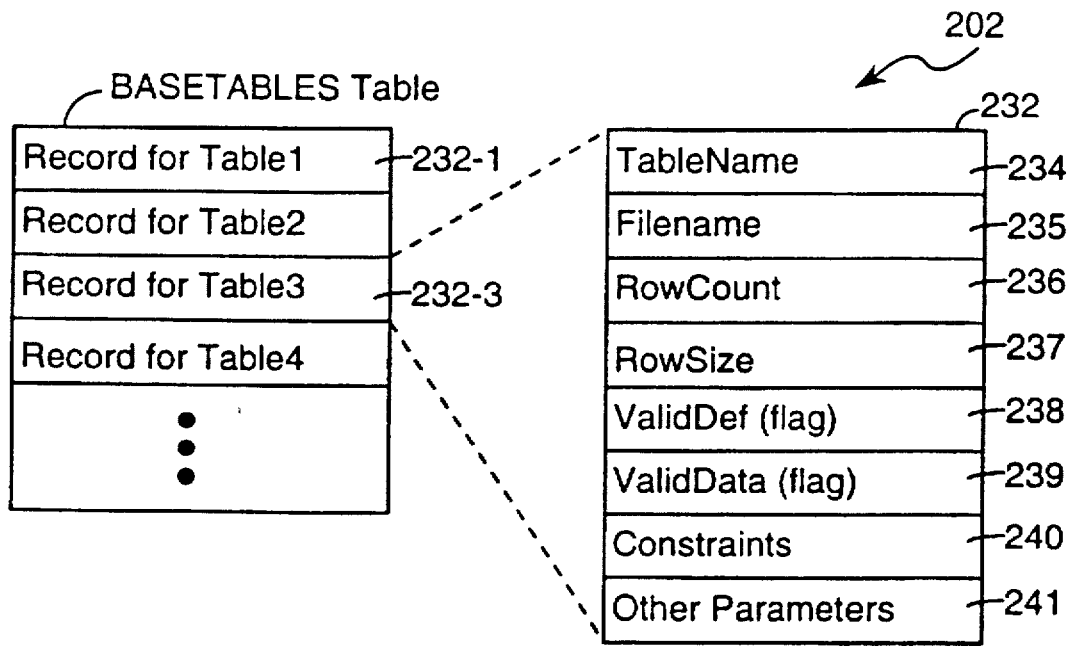

Referring to FIG. 4B, the "Base Tables" table 202 includes one record 232 for each database table in the database server. Each record 232 includes the following fields:

TableName 234 denoting the name of the database table;

FileName 235, indicting the name of the disk file in which the referenced database table is stored;

RowCount 236, indicating the number of rows in the table;

RowSize 237, indicating the maximum size (in bytes or words) of each row;

ValidDef 238, is a flag (Y or N) value indicating if the file has a valid definition, correct file label and catalog entries;

ValidDef 239, is a flag (Y or N) value indicating if the data in the table is consistent with data in the table's indexes and satisfies constraints on the table;

Constraints 240, is a flat (Y or N) value indicating whether the table has any defined constraints; and other parameters 241 not relevant here.

Figure 4C:
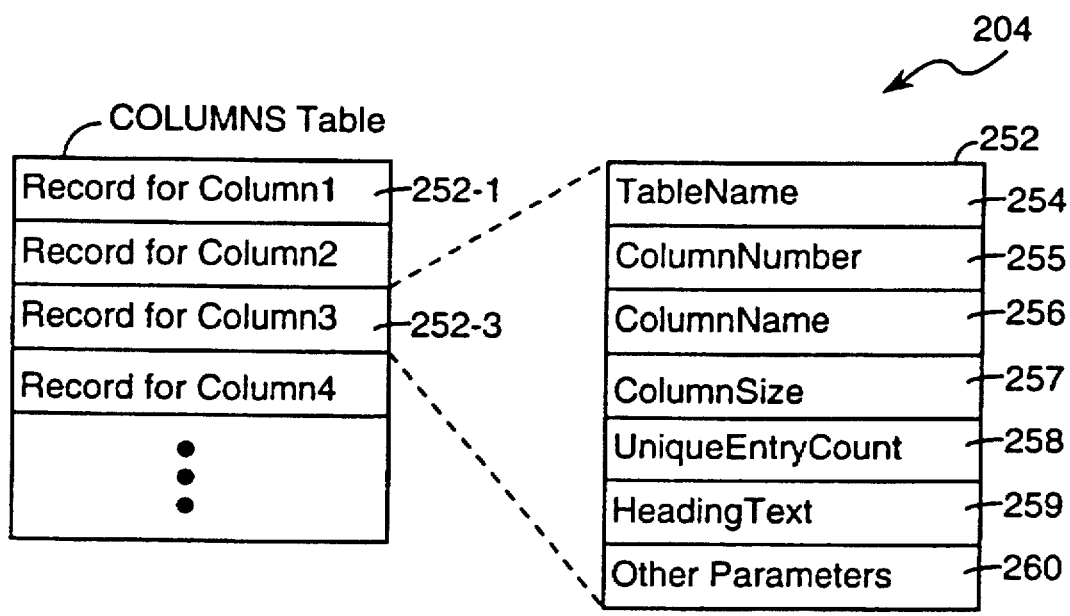

Referring to FIG. 4C, the "Columns" table 204 includes one record 252 for each column of each database table in the database server. Each record 252, representing characteristics of one database table column, includes the following fields:

TableName 254, denoting the name of the database table in which the column corresponding to this record 252 resides;

ColumnNumber 255, denotes a number indicating the position of the column in each row of the table, where the first column has a Column/Number of 0;

ColumnName 256, denotes the column's name, also called the SQL identifier, for the column;

ColumnSize 257, indicating the size (in bytes or words) of the data in the column;

UniqueEntryCount 258, denotes the number of unique data entries in the column for the table or table partition;

HeadingText 259, denotes a text string used as a default column heading when printing data extracted from this the column of the database table; and other parameters 260 not relevant here.

Figure 4D:
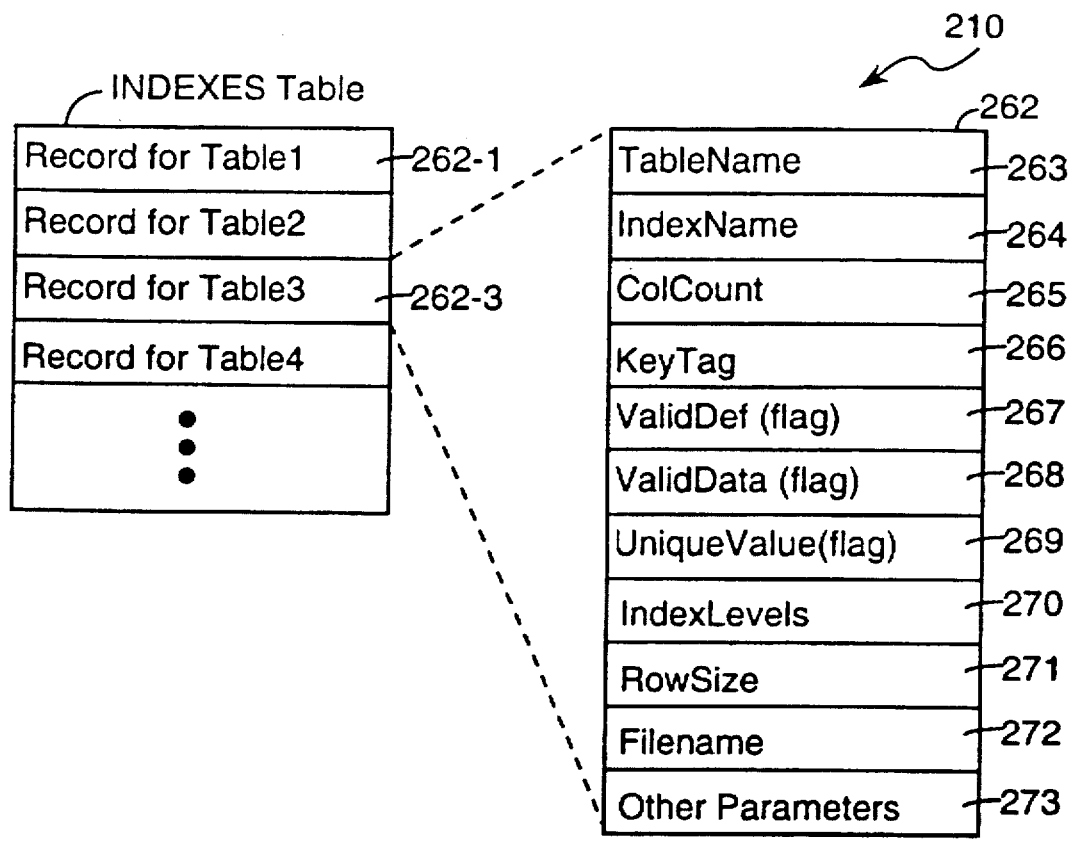

Referring to FIG. 4D, the indexes table 210 includes one record 262 for each database index in the database server. Each record 262 includes the following fields:

TableName 263 denoting the name of the database table;

IndexName 264, indicating the name of the index;

ColCount 265, indicating the number of columns used in the index, including the primary key columns;

Keytag 266, specifying the keytag, if this is a primary key index for the database table;

ValidDef 267, is a flag (Y or N) value indicating if the index definition is valid;

ValidData 268, is a flag (Y or N) value indicating if the index has valid data;

UniqueValue 269, is a flag (Y or N) value indicating whether all entries in the index are unique;

IndexLevels 270, indicating the number of levels of indexing in this index;

RowSize 271, indicating the size of each index record;

FileName 272, indicating the file that contains the index; and other parameters 273 not relevant here.

Figure 4E:
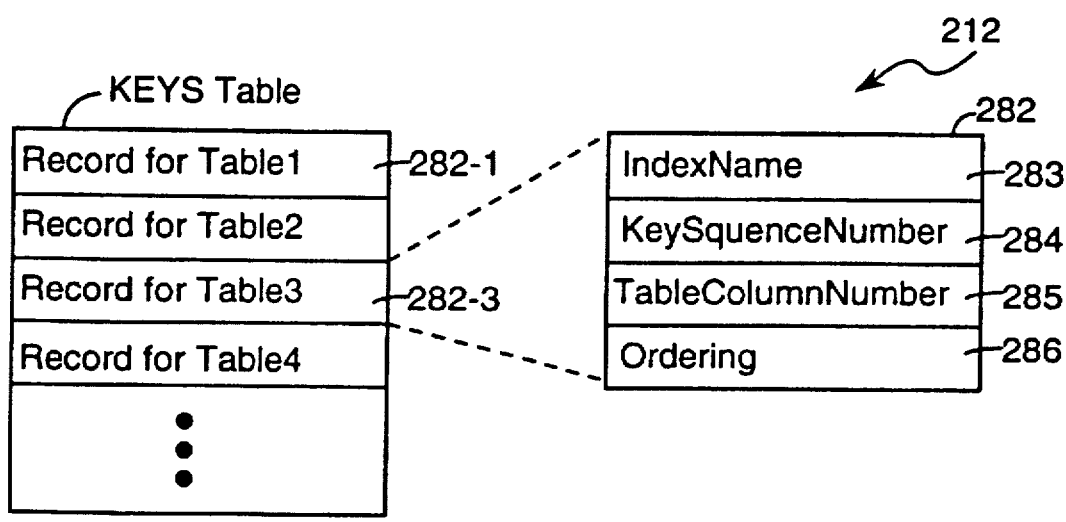

Referring to FIG. 4E, the Keys table 212 includes one record 282 for each column of the primary key and each other index for each database table in the database server. Each record 282, representing one table column for one key or index, includes the following fields:

IndexName 283, denoting the name of the index;

KeySequenceNumber 284, indicates the position of the column in each index row;

TableColumnNumber 285, indicates the position of the column in each table row; and Ordering 286, indicates whether the column is an ascending order or descending order column.

Figure 4F:
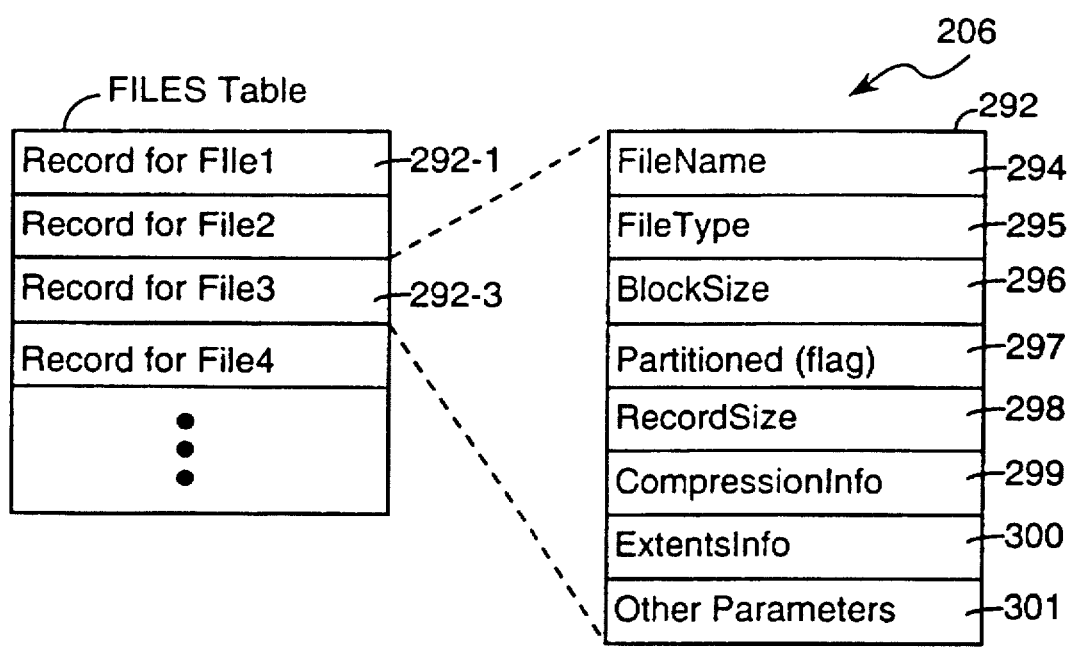

Referring to FIG. 4F, the Files table 206 includes one record 292 for each database table and index in the database server. Each record 292, representing characteristics of one database file, includes the following fields;

FileName 294, denoting the name of a database file, and corresponds to the FileName entry 235 in a Base Tables record 232 or an entry 272 in an index record 262;

FileType 295, indicates how data within the file is sequenced (e.g., entry sequenced, key sequenced, etc.);

BlockSize 296, denotes the size of the secondary memory blocks (e.g., 512, 1024, 2048 or 4096 bytes) in which the file is stored;

Partitioned 297, is a flag (Y or N) indicating whether or not the file is partitioned;

RecordSize 298, denotes the maximum length of a record in the file;

CompressionInfo 299, is a flag (Y or N) value indicating whether data in the data pages and index pages of the file have been compressed;

ExtentsInfo 300, denotes the size of the primary and secondary extents and the maximum number of extents in the file; and other parameters 301 not relevant here.

When a file is partitioned, the Partitions table 214 will contain one record for each partition of the file indicating the partition name and catalog entry for each partition as well as the starting values for each column in the file's primary key.

Figure 4G:
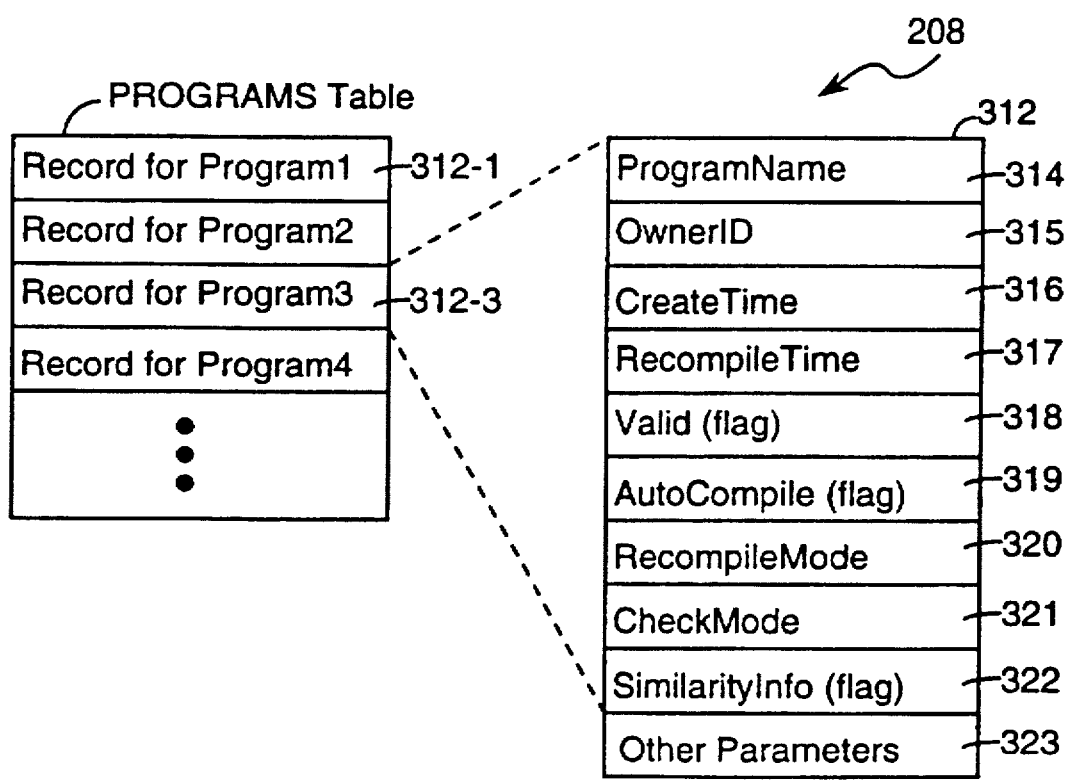

Referring to FIG. 4G, the Programs table 208 includes one record 312 for each registered program in the database server. Each record 312, representing characteristics of one program, includes the following fields:

ProgramName 314, denoting the name of a program;

OwnerID 315, identifies the program's owner;

CreateTime 316, is a timestamp value indicating when the program was first SQL compiled;

RecompileTime 317, is a timestamp value indicating when the program was last recompiled;

Valid 318, is a flag (Y or N) value indicating whether or not the program is valid;

AutoCompile 319, is a flag (Y or N) value indicating whether automatic recompilations of the program are allowed at run time, if required;

RecompileMode 320, is a mode value that is set to "All" or "OnDemand" and governs (in conjunction with the AutoCompile and CheckMode parameters) when program and statements within the program are recompiled, as explained in more detail below;

CheckMode 321, is a mode value that is set to "InvalidProgram," "InvalidPlans," or "InoperablePlans," and governs (in conjunction with the AutoCompile and REcompileMode parameters) when the program and statements within the program are recompiled;

SimilarityInfo 322, is a flag (Y or N) value indicating whether the compiled program includes similarity information for each of the program's compiled statements, where the similarity information for each statement consists of a subset of the schemas for database tables accessed by that statement; and other parameters 323 not relevant here.

Figure 4H:
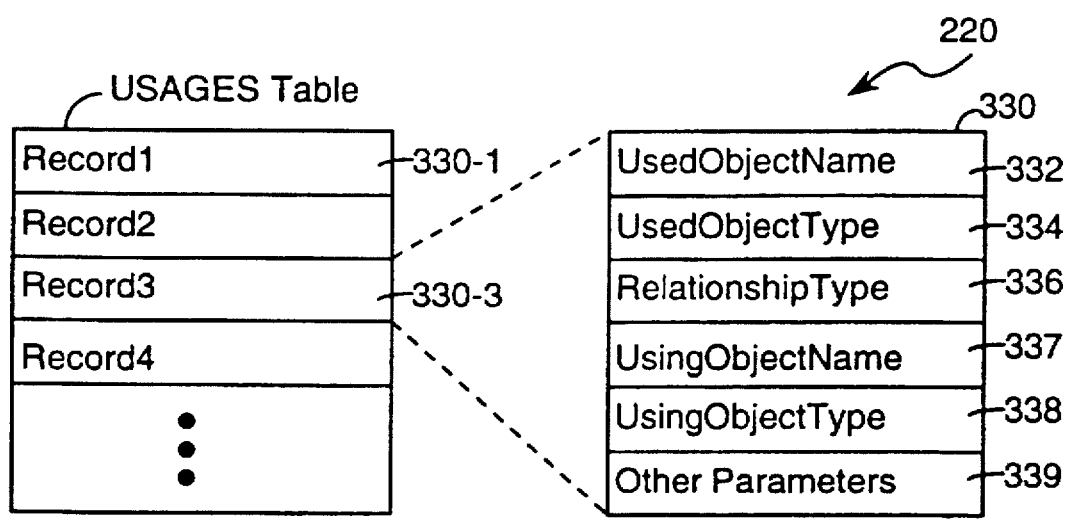

Referring to FIG. 4H, the Usages table 220 includes one record 330 for each usage of one object by another. For each program that uses a database table there is a record 330, representing that relationship that includes the following fields:

UsedObjectName 332, identifies the name of the "used" object, which in the context of this document is the table-name of a database table;

UsedObjectType 334, identifies the type of the used object, which in this case is "table"; other defined object types for used objects are "view" and "index";

RelationshipType 336, is flag that is enabled if the using object depends on the used object;

UsingObjectName 337, identifies the name of the "using" object, which in the context of this document is the name of a program;

UsingObjectType 338, identifies the type of the using object, which in this case is "program"; other defined object types for using objects are "view" and "index"; and other parameters 339 not relevant here.

The principal components of the computer system of FIG. 1 used to implement the invention are a portion of the SQL Compiler 128 termed the Optimizer and the SQL Executor 124. The Optimizer is a process component of SQL Compiler 128 which initially evaluates a search query and generates key expressions for the SQL Executor 124. The key expressions describe multi-column keys, including the range and IN list predicates on the individual columns. The Optimizer conducts general OR optimization and associates predicates with clusters and disjunct numbers in the manner set forth in Appendix A. The use of disjunct numbers in the Optimizer allows the invention to minimize memory space usage for the predicates and disjuncts. More particularly, in prior art compilers the process of converting a search query to disjunctive normal form requires that the predicates be repeated for all the disjuncts in which they appear. In the invention, predicates are not repeated: rather, a list of disjuncts in which each predicate appears is created in the manner set forth in Appendix A. In addition, many predicates share a common set of disjunct numbers. Another advantage of the invention resides in the treatment of IN lists as a single disjunct in order to minimize the number of disjuncts. An IN list is a shorthand way of specifying a list of single predicates on the same column that are ORed together. This list of same column predicates ORed together is treated as a single disjunct.

The SQL Executor 124 comprises a set of procedures in the system library that executes compiled SQL statements against database tables, views or the database catalogs. The SQL Executor 124 evaluates key expressions supplied by the Optimizer portion of SQL Compiler 128 in order to create a data structure termed a GEM-tree. Each GEM-tree contains information concerning key columns, describing ranges and exact values, predicates defined on each column, comparison operators and other information. The process of building the GEM-tree conducted in the SQL Executor 124 includes combining ranges and eliminating duplicates on the key columns, while preserving the order in each column (i.e., ascending order or descending order). After a GEM-tree has been constructed by the SQL Executor 124, values are retrieved from the tree to build the actual keys for reading data from the required tables. The specific manner in which the SQL Executor 124 constructs a GEM-tree and builds the actual keys for reading data from the tables is set forth in Appendix B.

In the process of constructing the GEM-tree, the SQL Executor 124 sorts and collapses values from different disjuncts in a column together so that individual records are only read once. This is a significant saving in the cost of executing a search plan, since all duplicate values are eliminated. In addition, the keys are built in such a fashion that the data from each index is read in index order, even when multiple disjuncts are present, which facilitates the accessing of individual records.

The use of disjunct numbers in the SQL Executor 124 on a per column basis allows the collapse of multiple column disjuncts so that the same record never needs to be read twice. This facilitates the sorting and collapsing of values by the SQL Executor 124.

The SQL Executor 124 also finds the minimum set of all predicates for a disjunct from all predicates for that column in a disjunct. This occurs when there are multiple predicates on a single column which conflict. The SQL Executor 124 finds the minimum set of all predicates by finding the minimum set of values necessary for the combination of predicates, which avoids unnecessary reading of data. Taken together with the sorting and collapsing of values from different disjuncts, this ensures that only the minimum amount of data need be read.

In the process of constructing the GEM-tree, the SQL Executor 124 recognizes missing keys and the specification of ranges and IN lists in the generalized key expressions supplied by the Optimizer portion of SQL Compiler 128. This permits a multi-dimensional view of the index, and allows efficient access even if the user has defined a column to the beginning of an index for purely partitioning purposes.

Specific examples of the features noted above are as follows.

Intervening Range

Assume the user search query includes the following predicates:
WHERE a=10
 AND b between 20 and 30
 AND c=40
 AND d=50;
In prior art systems, the predicates in column c and d cannot be used as keys because of the intervening range predicate on b. The invention allows the use of all four key columns in the following fashion.

Range predicates are processed in the SQL Executor 124 by stepping through the values of the column in the range. Assume the values of b between 20 and 30 are (20, 23, 25, 30). The SQL Executor 124 first performs a keyed access for a=10, b=20, c=40, d=50

After all the records for these key columns have been received by the SQL Executor 124, it requests from the file system the next value of b, which is 23. The value 23 is then substituted as the key value for b:

a=10, b=23; c=40, d=50

After these records are retrieved, the next value of b is selected (i.e., the value 25).

Missing Key Predicate

Assume the user search query includes the following predicates:
 WHERE
  b between 20 and 30
  AND c=40
  AND d=50;
Since the predicate for key column a is missing (i.e., unspecified), prior art systems cannot use this index for keyed access. According to the invention, however, the missing predicate for column a is treated as an implied range of MIN_VALUE to MAX_VALUE (including NULL values). The SQL Executor 124 first requests the first value from column a from the file system, and substitutes that value in the begin key values.

Assume the values for a include all values from 1 to 100. The SQL Executor 124 first performs a keyed access with the following values:

a=1, b=20, c=40, d=50

After retrieving the records for this set of values, SQL Executor 124 varies b through its four values:

a=1, b=23, c=40, d=50 a=1, b=25, c=40, d=50 a=1, b=30, c=40, d=50

SQL Executor 124 then obtains the next value of a from the file system and repeats the values for b:

a=2, b=20, c=40, d=50 a=2, b=23, c=40, d=50 etc.

The result is a total of 400 accesses.

IN Lists

Assume the user search query includes the predicates:
WHERE
 b between 20 and 30
 AND c IN (40, 100, 150)
 AND D=50;
Columns a and b are treated in the same fashion as in the missing key predicate example given above. In addition, the values of c are included. The SQL Executor 124 steps through all the given values for a, b and c. However, since the three values of c are specified by the IN list, the SQL Executor 124 can use these values directly (and need not request these values from the file system).

Elimination of Conflicting Predicates

Assume that the following view exists:
Create view VT as
 SELECT * from T where b IN (3, 9, 16, 25, 36);
Assume the user query is:
SELECT * from VT
 WHERE
  b between 20 and 30
  AND c IN (40, 100, 150)
  AND d=50;
The only valid value for b in this query is 25. The SQL Executor 124 finds the union of all the predicates for b, and recognizes that only the value 25 exists in both sets, so only that value for b will be used to retrieve records.

General OR Optimization

As noted above, general OR optimization is accomplished by associating the predicates with different predicate sets in disjunctive normal form (with the exception of IN lists which are processed as a unit). Predicates are in disjunctive normal form when only ORs exists at the outer level. For example, consider the query command:
 SELECT *

FROM T

WHERE (a=5 and ( (b=1 and c IN (2,4,9))
    OR (b=8 and c=7))
    OR (a between 4 and 6 and ((b between 8 and 10 and c between 6 and 9)
    OR (b=9 and c=11)

The disjuncts for this expression are:

(a=5 and b=1 and c IN (2,4,9))
    OR (a=5 and b=8 and c=7)
    OR (a>=4 and a<=6 and b>=8 and b<=10 and c>=6 and c<=9)
    OR (a>=4 and a<=6 and b=9 and c=11)

The SQL Executor 124 eliminates any conflicting predicates within each disjunct, and then combines the overlaps among the disjuncts so that only the minimum set of records is retrieved, and in the order of the index. For this example, the following retrievals are made:

a=4, b=8, c>=6 and c<=9
a=4, b=9, c>=6 and c<=9
a=4, b=9, c=11
a=4, b=10, c>=6 and c<=9
a=5, b=1, c=2
a=5, b=1, c=4
a=5, b=9, c=11
a=5, b=8, c>=6 and c<=9
a=5, b=9, c>=6 and c<=9
a=5, b=9, c=11
a=5, b=10, c>=6 and c<=9
a=6, b=8, c>=6 and c<=9
a=6, b=9, c>=6 and c<=9
a=6, b=9, c=11
a=6, b=10, c>=6 and c<=9

As will now be apparent, the invention affords several advantages over known B-Tree indexed access techniques. Firstly, by associating predicates with clusters and clusters with disjunct numbers, the invention permits the use of highly complex user search queries, and is thus not restricted to queries in which the predicates are already expressed in disjunctive normal form. In addition, the use of these associative techniques saves substantial space in memory by eliminating the need to store several copies of the same predicate. Further, the user can specify both ranges and IN lists in multiple key columns, and these ranges and IN lists will be observed in building the keys. Likewise, a missing key predicate, whether intentionally or inadvertently omitted, does not prevent the construction of a usable key index. Moreover, by sorting and collapsing values from different disjuncts and finding the minimum set of all predicates for a disjunct, repetitive reads of the same record are eliminated from the search key (which eliminates the need to construct a table of records that have been read) and only the minimum amount of data will be read in the proper order.

While the above provides a full and complete disclosure of the preferred embodiments of the invention, various modifications, alternate constructions and equivalents will appear to those skilled in the art. For example, although the invention has been described with reference to a DBMS employing SQL, other query languages may be employed, as desired. Therefore, the above descriptions and illustrations should not be construed as limiting the invention, which is defined by the appended claims.

29
General Expression Method (GEM)
*Internal Design Specification*
*Addendum*
Version: 1.1
Dave Birdsall
Rohit Jain
Harry Leslie
Hedieh Yaghmai
Source: \tess.$sqldoc.gemdoc.disjunct
Print Date: February 9, 1995
Copyright (c) 1995, by  TANDEM Computers, Inc.
APPENDIX A

Objective:

This paper attempts to describe how the optimizer will process the parse tree for a query to generate the structures necessary for GEM. These structure will be used for costing and to generate appropriate structures needed by the Executor to implement GEM. This is best done via an example. So let us consider the following WHERE clause:

```
((C = 10 AND B BETWEEN 5 AND 10) OR A IN (2, 4, 5)) AND
((A = 4 AND C = 5) OR (C IN (5, 10) AND (B = 5 OR A = 2)))
```

In order for the Executor to be able to use the above set of predicates for GEM, they would have to be in disjunctive normal form. Our objective then is to get these predicates into the following form:

```
   (A IN (2, 4, 5) AND A = 2 AND C IN (5, 10))
OR (A = 2 AND B BETWEEN 5 AND 10 AND C = 10 AND C IN (5, 10))
OR (A IN (2, 4, 5) AND B = 5 AND C IN (5, 10))
OR (B BETWEEN 5 AND 10 AND B = 5 AND C = 10 AND C IN (5, 10))
OR (A IN (2, 4, 5) AND A = 4 AND C = 5)
OR (A = 4 AND B BETWEEN 5 AND 10 AND C = 10 AND C = 5)
```

As you see, this is not quite in disjunctive normal form since we do have sets of ORs on the same column specified in the form of IN lists. The Executor is able to deal with that. For our purpose we will call each of the above 6 set of predicates that are ORed together as *disjuncts*.

You will notice that we can transform some predicates e.g. (A IN(2, 4, 5) AND A = 2) in the first *disjunct* to A = 2. Similarly we can transform (B BETWEEN 5 AND 10 AND B = 5) to B = 5. We can also get rid of the sixth *disjunct* altogether since C cannot possibly be = 10 AND = 5 at the same time. There are many other such transformations possible. We will not attempt to do those in the optimizer. We will leave them for the Executor which will have the values for params and host variables available to it.

As you can see the fourth *disjunct* does not have a predicate on column A. Assuming that the index columns are A, B, C the Executor will need predicates on all columns to use GEM. It will add the *missing predicates* of the form (A >= Low AND A <= High) to facilitate this. The optimizer will not do this.

Since the optimizer is generating the individual GEM key predicates for the Executor it *can* perform a simple NOT transformation as well. It *can* transform a predicate of the form Column NOT = *value* (where *value* is a constant, literal, param, or host variable) to (Column < *value* OR Column > *value*). When the selectivity of the column is low this could be very beneficial.

Terminology:

Let us first define some terminology so that there is a better probability of this paper being understood. We have already defined the concept of *disjuncts* as we stated our objective.

We will introduce another term -- *Cluster*. *Clusters* are formed of *equality* predicates on the same column that are all ORed together. Due to the complexity in costing a mixed set of ORed predicates, only equality predicates are considered for clustering at this time. *Clusters* are also formed of predicates that are ANDed together regardless of the columns they are on. The purpose of grouping predicates together into *clusters* is to reduce redundancy in structures generated in the optimizer. For example, we will *cluster* predicates of the form (A = 2 OR A = 4 OR A = 5) and (C = 10 AND B >=5 AND B <= 10). Other forms of predicates (multi-valued, columns on both or neither side of the binary relational operator, <>, unary relational operators such as EXISTS, unary logical operators such as IS NULL, NOT, etc., and LIKE) are not clustered with other predicates. They are assigned their own *cluster*.

Date: February 9, 1995

Internal Spec                    GEM                              Optimizer

So what we need at the end is each predicate pointing to the *cluster* it belongs to and then each *cluster* pointing to the *disjuncts* it participates in. An illustration of this is as follows:

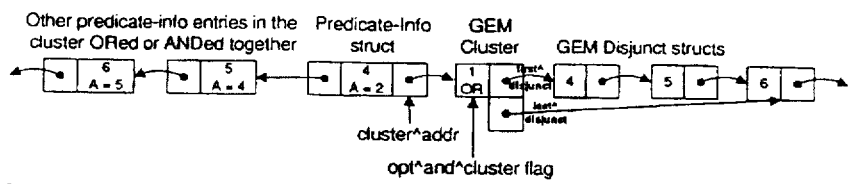

So as you can see, each predicate represented by its Predicate-Info entry points to its GEM Cluster. A new field called *cluster^addr* in Predicate-Info will facilitate this. The GEM Cluster entry will indicate whether the group of predicates are ANDed or ORed together. A flag in the *cluster^flags* field of *opt^gem^cluster^struct* called *opt^and^cluster* will indicate this. The GEM Cluster entry will then point to a list of GEM disjuncts that it participates in. Each disjunct entry points to the next.

Here is a summary of the new fields and structs up to this point:

- The *predicate-info entry (opt^predicate^struct)* will have these new fields:
  ⇒ *cluster^addr*
     Points to the GEM cluster entry that this predicate-info entry belongs to.

- The *GEM Cluster entry (opt^gem^cluster^struct)* will consist of:
  ⇒ *opt^and^cluster* in *cluster^flags*
     This bit flag indicates whether the relationship between the cluster entries is an OR or an AND. It will be FALSE (0) for an OR cluster and TRUE for an AND cluster.
  ⇒ *opt^cluster^in^all^disjuncts* in *cluster^flags*
     This bit flag indicates that this cluster participates in all disjuncts and therefore does not point to a list of disjuncts.
  ⇒ *first^disjunct*
     This will point to the first disjunct in the list of disjunct entries that the cluster participates in.
  ⇒ *last^disjunct*
     This will point to the last disjunct in the list of disjunct entries that the cluster participates in.

- The *GEM Disjunct list entry (opt^gem^disjunct^struct)* will have:
  ⇒ *disjunct^id*
     This is a sequential id assigned to a disjunct from 0 on. It will indicate the disjunct that the cluster participates in.
  ⇒ *next^addr*
     Pointer to the next disjunct that the cluster belongs to.

As we go through the parse tree we will need to keep track of certain information so that we can cluster predicates together. Also, we will use lists of clusters, created as we go through the parse tree, to create the disjuncts. For that purpose we need a new structure. We will call this the *GEM Parse List*.

Date: February 9, 1995

Internal Spec                          GEM                          Optimizer

- The *GEM Parse list entry (opt^gem^parse^struct)* will contain:

⇒ *cluster^addr*
    This is the address of the GEM cluster entry. Predicates that can be clustered together will be assigned the same cluster address.

⇒ *pred^info*
    This is the address of the predicate-info entry created. At an OR/AND node this address will be used to update the *cluster^addr* for the predicate-info. This will indicate the *cluster* to which the predicate has been assigned.

⇒ *col^info*
    This will point to the column (column-info entry) the predicate is on. If it matches the col^info address of other predicates in an existing cluster, this predicate will be added to that same cluster.

⇒ *and^to^list*
    This points to another GEM Parse list. It indicates that the current entry is ANDed to every entry in the other list. This is the result of AND operations. The cross product between multiple lists helps in generating disjuncts. More on this later.

⇒ *next^addr*
    This points to the next *GEM Parse list* entry.

Traversing the Parse Tree:

So let us assume that the parse tree representation of the WHERE clause, presented earlier, is as follows:

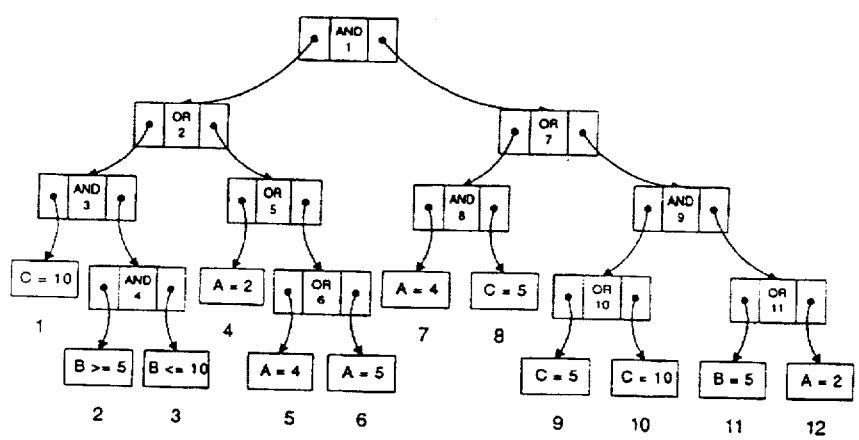

Logical nodes and predicates have been numbered for the discussions that follow.

We know that optp^analyze^logical^expr currently traverses this parse tree. It processes the tree left hand side (LHS) first and then moves to the right hand side (RHS). It does this recursively. The logical operation nodes are numbered in the order they will be accessed. However, it will move back up the tree before it can go down the RHS.

We will pass a null *GEM Parse list* from the first node down. The list will have entries for *clusters* of predicates that have been formed as we make our way through the parse tree. These *clusters* will help build the disjuncts that the cluster of predicates participate in. So let us follow the parse tree and see what we will generate for GEM.

Internal Spec GEM Optimizer

We first encounter the predicate C = 10. We will do the following:
⇒ Create an entry in the GEM Parse list.
⇒ Assign to pred^info, the address of the predicate-info entry for this predicate.
⇒ Initialize the col^info address to that of the column in the predicate -- column C. This will only be done when the predicate is a logical comparison with a constant or a hostvar/param. This is to later consolidate ORs on the same column into a chain. If the predicate is not a simple comparison such a consolidation cannot be done and NULLP should be passed back for col^info.
⇒ Return the list to node 3.

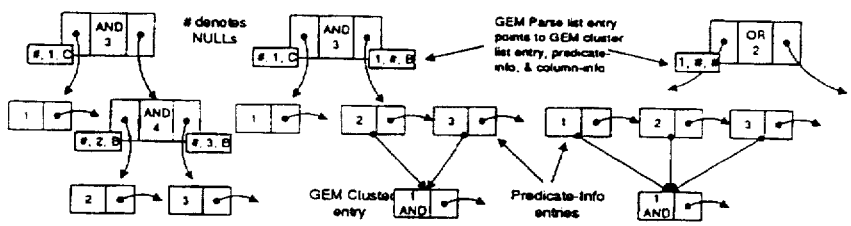

We will save the list just returned and then proceed to node 4 (RHS). From node 4 we will pass a null GEM Parse list to its LHS that will return with the address to the predicate-info entry for B >= 5 (in pred^info) and the col^info address for column B. We will save these, and proceed to the RHS that will return with the address to B <= 10 and the col^info address for column B.

When we get back to node 4, since it is an AND node, we will determine if we have single entries in the GEM Parse lists returned from the LHS and RHS, or multiple ones. If we have single entries, we can potentially merge them into a single cluster. We will talk about multiple entries in the list later. We find that currently there is one entry in each list. However, there has been no cluster^ addr assigned. Also, the col^info addresses for the predicates on the LHS and RHS are the same. So we will do the following:

⇒ Since no cluster^addr has been assigned, create a GEM cluster entry.
⇒ Set the field opt^and^cluster to TRUE for AND.
⇒ Assign the new cluster's address to cluster^addr for both the LHS and RHS parse list entries.
⇒ Assign this address to cluster^addr in predicate-info for both the LHS and RHS predicates.
⇒ Clear pred^info in both the LHS and RHS Parse list entries since they have served their purpose.
⇒ Keep the col^info (for column B) in the RHS parse list entry, since it was the same as the LHS col^info. This information is really not relevant for predicates being ANDed together. However, in the future if it is necessary to keep predicates on separate columns in separate clusters this information can be used for ANDs as well.
⇒ Send the RHS Parse list back to node 3.

At node 3 we note that we have lists from the LHS and RHS that have single entries. Their col^info addresses don't match -- one is for column C and the other for column B. We can still chain these predicates together since we are at an AND node. So we do the following:

⇒ Assign the RHS cluster address to cluster^addr in the LHS parse list entry.
⇒ Assign this address to cluster^addr in predicate-info for the LHS predicate and clear pred^info.
⇒ Assign NULLP to the RHS col^info since the col^info returned from the LHS and RHS are different (LHS refers to column C and RHS refers to column B).
⇒ Return to node 2 with the RHS parse list consisting of a single entry.

Date: February 9, 1995

Internal Spec        GEM        Optimizer

We go down the RHS of node 2 passing down a null GEM parse list. We perform operations similar to the above for this leg of the parse tree:

⇒ Assign a new cluster address to all three predicates pointing to a new GEM cluster entry.
⇒ Set opt^and^cluster to 0 for OR.
⇒ Return to node 2 with a single entry in the parse list. The col^info will point to column A.

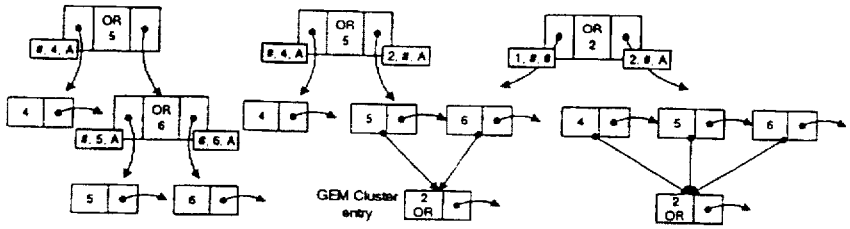

Now we are back at node 2. Until now we have had GEM parse lists returned to us with single entries from the LHS and RHS. These lists have either had no cluster addresses assigned or one assigned only for the RHS list. At this node we have parse lists returned with a single entry from both the LHS and the RHS and they are not for the same cluster. So we really cannot merge the LHS with the RHS. All we can do at this point is chain the LHS parse list entry to the RHS parse list entry and pass it back to node 1. We do that by pointing the next^addr field in the last entry of the RHS parse list to the first entry in the LHS parse list. We pass back the RHS parse list. It will have NULLP in col^info for the two entries in the list since they have no relevance beyond this point. However, the only thing that can indicate that they don't have relevance is the fact that the LHS was a set of ANDs and the RHS was a set of ORs. This is indicated in their corresponding GEM Cluster entries.

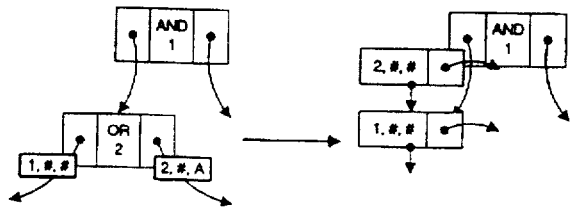

We now go down the RHS of node 1. We will eventually end up at node 7 again after having processed its LHS. We would have assigned A = 4 and C = 5 to a new AND cluster. What we will get back from the LHS for this node is the address of this new cluster in a single entry GEM parse list. Col^info would be set to NULLP, since the col^info returned at node 8 would be for columns A and C (different columns). Pred^info will be NULLP, since it would have been used to assign the cluster address to the predicate-info entries for the two predicates.

At node 9 we will get back from its LHS another parse list with an entry. It will have the address to column C in col^info. C = 5 and C = 10 will point to a new GEM cluster entry. This entry will indicate that they are related to each other by an OR.

Date: February 9, 1995

Internal Spec　　　　　　　　　GEM　　　　　　　　　　　　　Optimizer

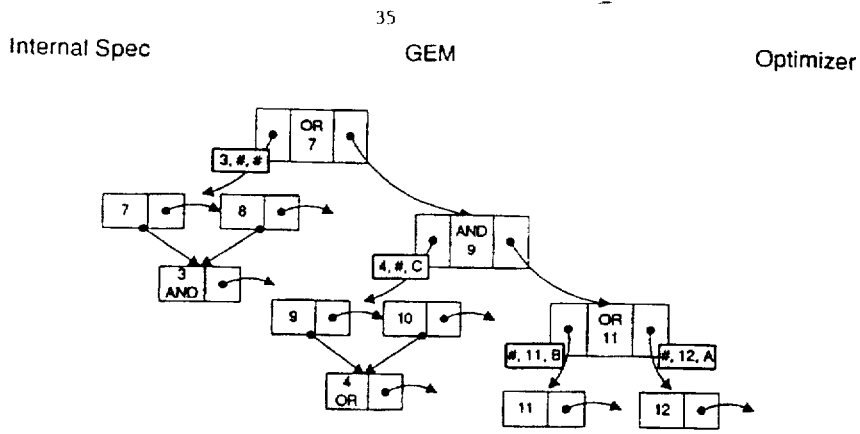

At node 11 we will get back col^info addresses that differ (for columns B and A). We cannot chain these together since they are ORed. We do not have any clusters created at this point -- both the LHS and RHS lists returned entries with no cluster address. We will do the following:

⇒ Create two new cluster entries. Assign B = 5 to one of these and A = 2 to the other.
⇒ Set opt^and^cluster to OR since there is a single predicate in the clusters which can be ORed to predicates at higher levels.
⇒ Chain the LHS parse list entry to the RHS via next^addr of the RHS entry.
⇒ Return the RHS parse list to node 9 with col^info for both entries intact.

Let me bring your attention back to this last statement. You noticed that at node 2 which was an OR we passed NULLP back in col^info. We don't do that here for the following reason. Say we had a WHERE clause that said B IN (1, 5) OR A = 2. Essentially we will end up with parse nodes at the end that looked similar to node 11 and down. However, there would be another OR node preceding it with its LHS having B = 1. Even though B = 5 and A = 2 cannot be chained together B = 1 and B = 5 can be chained in an OR relationship. That is the reason we are passing the col^info back with their respective parse list entries. At each OR node we have to be aware of passing this information back.

From the same token at each OR node we have to be aware of looking for such cases so that appropriate predicates can be clustered together. Our example does not have such a case. AND nodes do not have the same issue. At each OR node, with multiple parse list entries from the RHS, we will have to compare the col^info from the LHS to the col^info from all RHS entries. If there is a matching entry in the RHS list and if the cluster entry for it indicates an OR, we can add the LHS entry to the same cluster. The cluster^addr for the LHS predicate will be assigned the same cluster address.

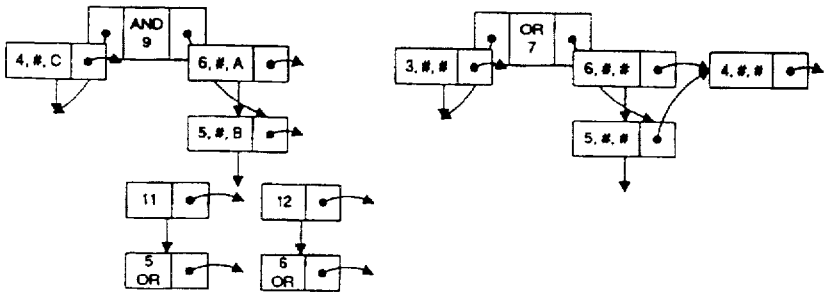

Date: February 9, 1995　　　　　　6

| Internal Spec | GEM | Optimizer |
|---|---|---|

So we now make it back to node 9 with the GEM parse list from the LHS with a single entry and one from the RHS with 2 entries. It would seem that we would have to perform a cross product between these two lists since we are at an AND node. So for each entry from the RHS parse list we will have a pointer to the first entry of the LHS list (or the only entry in this case). We have called this pointer in the GEM Parse list *and^to^list* for the list that it will be ANDed to. We will set the col^info fields for all three entries to NULL, since they have no relevance above this node (we are at an AND node).

At node 7 we have again a list with one entry from the LHS and one with two entries from the RHS (though each of them point to yet another entry that they are ANDed to). Since we are at an OR node we will just change the next^addr for the last entry in the RHS list to point to the LHS list entry. We will set col^info for the LHS list entry to NULL. Even though we are at an OR node the cluster from the LHS is an AND cluster.

We are now back to node 1. We have a list with two entries from the LHS and 3 from the right. We have to perform a cross product again. We will go through the parse list from the RHS and point each entry to the list on the LHS. As we go through the RHS list we see that the first entry already points to another list. So we go to the other list and make it point to the LHS list using the and^to^list field to do so. When we proceed to the next entry in the list we see that it is pointing to the same list as the first so we are already set for that. For the third entry in the list we again assign the address of the first entry in the LHS list to and^to^list since it is currently null. We maintain the cross product information in this fashion instead of completely materializing it at this time to reduce redundancy. We are finally done with the processing of the parse tree.

There may be cases when the top-most node in the parse tree is an AND and it gets a list with only one cluster entry from the LHS. If there are multiple entries returned from the RHS, essentially the cluster returned from the LHS is part of every disjunct that will be generated. In such cases we can avoid adding any disjuncts for that cluster to save space. For this Cluster entry the flag *opt^cluster^in^all^disjuncts* will be set to indicate that the cluster participates in all disjuncts.

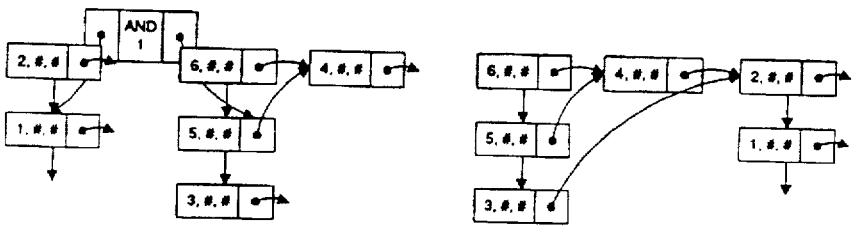

Generating the Disjuncts:

So now that we have gone through the parse tree and assigned predicates to clusters, we need to form the disjuncts and assign the clusters to those disjuncts. To do that we will use the GEM parse list that resulted from our trip through the parse tree. We will treat this list as made up of three parse lists ANDed together. The first parse list has clusters 6, 5, and 3 as entries. The second has cluster 4. The third has entries for clusters 2 and 1.

Lets start at the first entry in the first parse list -- for cluster 6. This entry points to the second parse list via its *and^to^list* field. We go to the second parse list. Its entry for cluster 4 points to the third parse list. So we get to the third parse list. Its first entry for cluster 2 does not point to any parse list. So at this point we create our first disjunct. We start with 0. Since the entry is for cluster 2 we go to cluster 2 and point its *first^disjunct* and *last^disjunct* to a new disjunct entry with a *disjunct^id* of 1. Now that we are done with that entry, we proceed to the next entry in the third parse list which is for cluster 1. Again, it does not point to another parse list. So we create another disjunct. This will have a *disjunct^id* of 1. So Internal Spec     GEM     Optimizer we go to cluster 1 and point it to this disjunct. Done with the third parse list we come back to the cluster 4 entry in the second parse list. We know that this cluster would have to belong to all the disjuncts we just created (0 through 1). So we hang off disjunct entries 0 and 1 from cluster 4. Cluster 4's *first^disjunct* points to disjunct 0 and its *last^disjunct* points to disjunct 1. Coming back then to the first parse list, we do the same for cluster 6 which gets the same two disjuncts 0 and 1.

We now proceed to the second entry in the first parse list. This is for cluster 5 and takes a similar path. We get to the entry for cluster 2 in the third parse list. Since the last disjunct created was 1 this time we start with disjunct 2. We add disjunct 2 to the list of disjuncts for cluster 2. Its *first^disjunct* points to disjunct 0 and *last^disjunct* to disjunct 2. We then go to the next entry for cluster 1 and create another disjunct -- with a *disjunct^id* of 3. Now cluster 1 will point to disjuncts 1 and 3. Coming back to the cluster 4 entry in the second parse list we know that the disjuncts we just created were 2 through 3. So we add those disjuncts to cluster 4's list of disjuncts. Coming back to the cluster 5 entry in the first parse list, we create entries for disjuncts 2 and 3 for it as well.

Finally we go down to the next entry in the first parse list for cluster 3. It points to parse list 3. So we go to that list and its first entry for cluster 2. We create a new disjunct 4 for it. We proceed then to the next entry for cluster 1 and create a new disjunct (5) for that as well. Coming back to the cluster 3 entry in the first parse list, we create disjuncts 4 through 5 for it.

If for a cluster entry the flag opt^*cluster^in^all^disjuncts* is set we will not physically create the disjunct entry for it. The disjunct, however, will logically be created by incrementing the last disjunct by 1.

The following diagram shows this perspective. The cluster entries seem to be duplicated but they really are not. Since we are looking at it from a column perspective the diagram looks that way. Essentially predicates on different columns are pointing to the same cluster entry and belong to the same cluster. Clusters 1 and 3 are repeated for illustration.

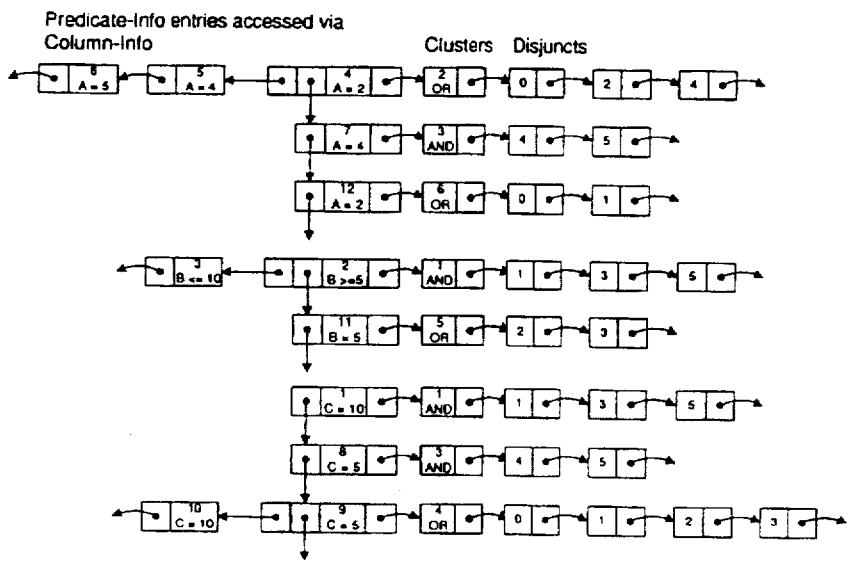

Date: February 9, 1995

Internal Spec        GEM        Optimizer

So, for each column we can start from the column-info entry and go through opt^pred^col^struct for all predicates for that column. The opt^pred^col^struct will point to the predicate-info entry for the predicate. This predicate-info entry will point to the GEM cluster entry that it belongs to. The cluster entry will point to the disjuncts it participates in. If we did that using the previous diagram as a guide we would get the following matrix of columns by disjuncts -- the objective that we had when we started out:

COLUMNS

| Disjunct | A | B | C |
|---|---|---|---|
| 0 | (= 2 or = 4 or =5) & = 2 | | = 5 or = 10 |
| 1 | = 2 | >= 5 & <=10 | = 10 & (= 5 or = 10) |
| 2 | = 2 or = 4 or =5 | = 5 | = 5 or = 10 |
| 3 | | (>= 5 & <=10) & = 5 | = 10 & (= 5 or = 10) |
| 4 | (= 2 or = 4 or =5) & = 4 | | = 5 |
| 5 | = 4 | >= 5 & <=10 | = 10 & = 5 |

Creating the Executor Structures:

The structures generated for the Executor start with the column (each key column of the selected index). Each key value point to a disjunct list (from 0 to 5 in this case). Each of those disjuncts points to the clusters that participate in that disjunct. Each cluster then points to the list of predicates that apply to that column and disjunct. The only difference between the clusters created for the optimizer and those for the executor are that the ones for the executor will not AND predicates on two separate columns. An executor cluster restricts itself to a single column.

This is illustrated by breaking cluster 1 into 1B and 1C and cluster 3 into 3A and 3C. The cluster entries have been repeated on the right hand side for illustration only. Actually the clusters on the left will directly point to the first predicate in the cluster. Disjuncts pointing to no clusters will have a flag indicating missing predicates.

Date: February 9, 1995

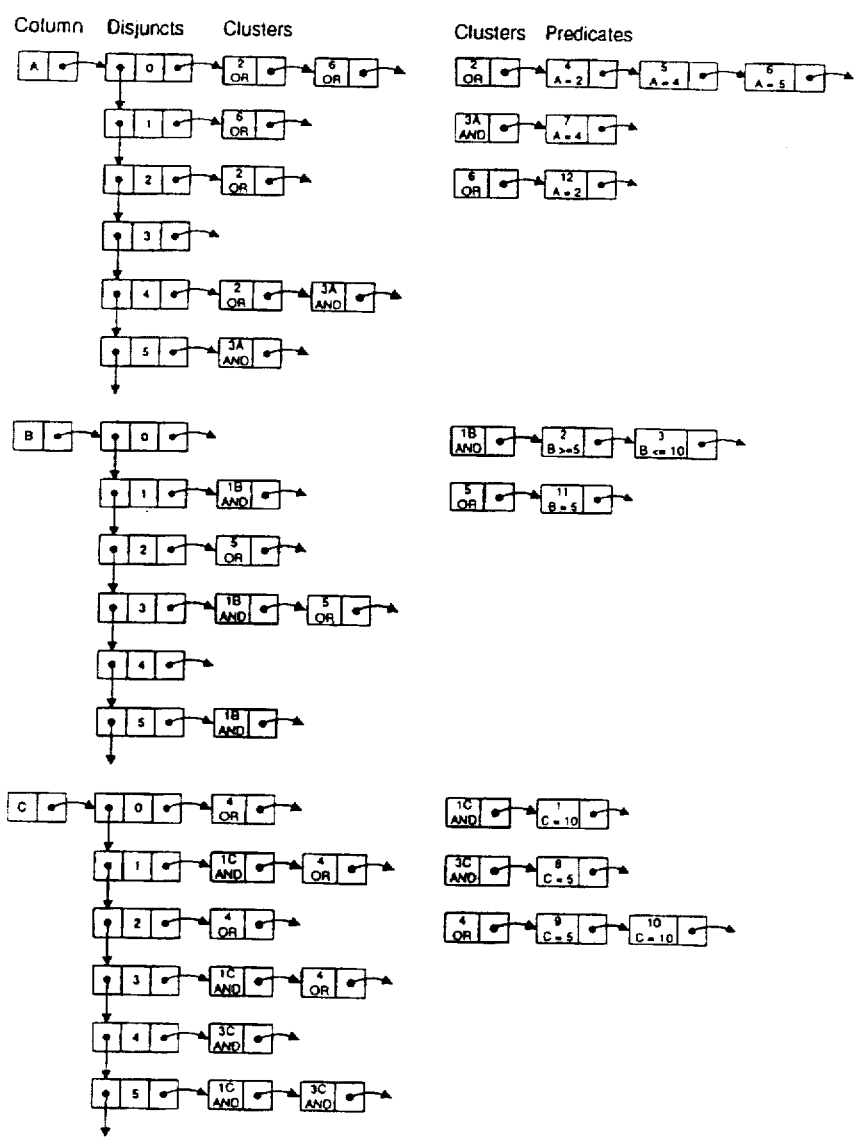

GENERAL EXPRESSION METHOD (G E M)

Internal Design Specification

Rohit Jain
Harry Leslie
Hedieh Yaghmai
Dave Birdsall

Version: 1.1 - 2/9/95

Print date : Apr 13, 1995 (10:33:05)
Source     : $SQLDOC.GEMDOC.IS on \TESS

Copyright (c) 1995, by Tandem Computers, Inc.

APPENDIX B

41   General Expression Method

1.0 INTRODUCTION

This document outlines the internal design and architecture for implementing a new access method in NonStop SQL to augment range and list processing. This new access method will result in performance gains when dealing with large databases. It will allow SQL to use indexed access when complicated expressions are specified in a query.

There is a customer commitment to make this enhancement available by April of 1995.

1.1 Document History

Version 1.0   December 10, 1994   Draft version.
Version 1.1   February 9, 1995    Ready for wider review.

1.2 Related Documents

[1] "Begin/End Index Access with Embedded Ranges," Harry Leslie, (11/11/93).

[2] "A New Access Method for Decision Support Queries," Sunil Sharma and Hedieh Yaghmai, (4/4/94).

[3] "Begin/End Key with Embedded Ranges and In Lists, General Expression Acess Method (GEM)," Dave Birdsall, Rohit Jain, Harry Leslie, Hedieh Yaghmai, (12/5/94).

[4] "General Expression Method(GEM) External Specification," Rohit Jain, Harry Leslie, Hedieh Yaghmai, (12/15/94).

[5] "Begin/End Key with Embedded Ranges and In Lists," Harry Leslie, Sunil Sharma, Hedieh Yaghmai, (4/8/94).

2.0 SUMMARY OF EXTERNALS

The general expression access method (GEM) will allow users to specify queries with arbitrarily complex expressions. The method will normally access only those records which are needed and no more.

The SQL compiler will need to determine the number and cost of necessary accesses.

Executor algorithms to support GEM merge expressions at runtime to eliminate duplicates. Fetch processing calls the GEM algorithms to obtain subsets for scanning. When all subsets have been traversed, fetch processing returns EOF.

General Expression Method

A define will be available to the users to control when the new access method is used. These defines are:

* =_sql_cmp_use_gem

* =_sql_cmp_no_gem

3.0 SUMMARY OF INTERNAL DESIGN

We describe the internal design for run-time and for compile time.

3.1 Design Overview

At compilation time a series of new key expressions will be generated for the executor. These expressions will describe a multi-column key, and the range and IN list predicates on those columns. The generated expressions are evaluated at execution time by new key building routines to create a data structure which we will refer to as a GEM-tree. The GEM-tree will contain information about the key columns, describing ranges and exact values, state and context information, predicates defined on the column, comparison operators, etc.

Building the GEM-tree consists of combining ranges and eliminating duplicates on the key columns at runtime. After the GEM-tree has been prepared, values are retrieved from it to build keys for reading data from the table. Probes into the table will be on exact key values and no ranges are specified, other than on terminating columns. Gaps in values of columns will be skipped; that is no keys will be built for values which do not exist in the range.

3.2 Design Objectives

This project's main objective is to improve the performance of queries against large databases. The new access method will support browse and non-browse accesses and will provide as much concurrency as possible. It will not introduce any regressions where existing queries can no longer run, or have a degradation in their performance.

3.3 Run Time Processing

Run time processing consists of two phases: GEM-tree construction and GEM-tree traversal.

GEM-tree construction takes a predicate list from the RTDU, representing the key expression in cluster disjunctive normal form General Expression Method (defined below), instantiates outer values, and transforms the result into a GEM-tree. Because we must have instantiated outer values, GEM-tree construction must take place at cursor open time.

GEM-tree traversal traverses the GEM-tree (no surprise there), generating key values for table access. The set of key values generated is no more than those described by the key predicates. We may generate less, if we know that certain key values do not exist in the base table. GEM-tree traversal takes place at cursor fetch time. A fetch may cause zero or more key values to be generated.

3.3.1 GEM-tree Construction

Conceptually, GEM-tree construction consists of two steps. We first build a GEM-tree for a single disjunct (defined precisely later). We then merge these disjuncts together. This is done for each key column independently.

In pseudo-code,

```
For each disjunct
   For each column, from rightmost key to leftmost (*)
      Build a GEM-tree for that column and that disjunct (Stage 1)
      If it is empty
         Exit inner for loop, advancing to next disjunct (**)
      Else
         Merge it into the result GEM-tree (Stage 2)
      End if
   End for
End for
```

The logic at (*) and (**) deserves some explanation. If a GEM-tree for a column for a given disjunct is empty, that means that the predicates for that column contradict one another. That is, no values will satisfy the column predicates for that disjunct. Therefore, we can discard the disjunct as a whole.

We work from rightmost key to leftmost at (**) so that there will be no probes on that disjunct. If we work from leftmost to rightmost, there may be GEM-tree entries for the first column for that disjunct. We may do I/O's to find values for that column. Then we traverse to the next column and discover there aren't any values for that disjunct. We would have done unnecessary I/O.

On the other hand, working right to left, we may get GEM-tree entries in columns to the right that we never traverse to. This does no harm (other than a bit more CPU during traversal perhaps); it costs no I/O's. This will become more clear once the GEM-tree traversal algorithm is explained below.

If, in some disjunct, there are no predicates on some key column, it simply means that all possible values in those columns are selected.

Before describing the stages in detail, we give some definitions.

General Expression Method 3.3.1.1 Definitions - GEM-tree, Predicate List.

An <u>atom</u> is a predicate of the form <column> <op> <value>, where <value> is the result of some expression evaluated at cursor open time (or before), and <op> is <, <=, =, >= or >, or of the form <column> IS NULL. (Note in particular that <> is excluded, and IS NOT NULL is excluded.)

A <u>cluster</u> is a disjunction of atoms all having the same <column>. An atom by itself is also considered a cluster.

A <u>disjunct</u> is a maximal conjunction of clusters. A cluster by itself is a disjunct, if it is not ANDed with any other. Note that this definition is more restrictive than the usual mathematical definition. (In mathematics, a disjunct is any operand of an OR.)

A <u>disjunct number</u> is a number identifying a disjunct. Disjuncts are numbered sequentially, starting at 0.

A predicate is in <u>cluster disjunct normal form</u> if it is a disjunction of disjuncts. This differs from the usual definition of disjunctive normal form in that we allow clusters as operands of AND nodes instead of restricting them to just atoms.

A <u>predicate list</u> is a physical representation of predicates on a particular column across all disjuncts, for a predicate in cluster disjunct normal form. (The predicate as a whole, then, is represented by a sequence of these lists, one list per key column.) The Generator creates such lists. A predicate list consists of entries of the following form, sorted in disjunct number order.

<disjunct number> <op> <value> <OR flag>

Each entry represents an atom of the form <column> <op> <value> (the <column> is omitted in the physical representation, since it is the same for all predicates in the list).

The <OR flag> is on if this atom and the next one belong to the same cluster. (Note that this would imply that they are in the same disjunct also.)

An <u>interval</u> is a range of values. It may be closed (in which case it includes its endpoints), open (in which case it excludes its endpoints) or semi-open (in which case it includes exactly one of its endpoints). We denote an interval as follows:

(a,b) - the range of values x satisfying a < x < b
   [a,b] - the range of values x satisfying a <= x <= b
   (a,b] - the range of values x satisfying a < x <= b
   [a,b) - the range of values x satisfying a <= x < b Note that this definition is the same as the usual mathematical definition of the term "interval".

General Expression Method

The maximum possible value is denoted as <u>hi</u>; the minimum possible value as <u>lo</u>. So, the interval containing all possible values for a column is denoted [lo,hi].

If a column is nullable, we consider hi to be the NULL value. That is, NULL is added to the set of possible values, after the highest non-null value. So, for our purposes here, NULL > all non-null values, and we consider NULL = NULL.

This is different than the SQL sense of NULLs, but identical to how FS2 and DP2 treat key ranges. It should be clear from context whether comparison is meant in key order sense or in SQL sense: when we discuss predicates, we mean SQL sense; when we discuss intervals and values in an interval, we mean key order sense.

In some cases, we will need to refer to the maximum non-null value. We refer to this as <u>non-null-hi</u>.

A <u>reference set</u> is a set of disjunct numbers.

A <u>GEM-interval</u> is a set of the form { I, R } where I is an interval and R is a reference set. It is intended to represent a range of values, and relate that back to disjuncts that that range of values satisfies.

A <u>GEM-tree on column</u> A is a sequence of GEM-intervals, having the property that the intervals are disjoint, and the sequence is ordered by beginning endpoint of the intervals (using the convention that [a,a] precedes (a,b]).

A <u>GEM-tree on columns A, B, C, ... N</u> is a sequence G(A), G(B), ..., G(N) where G(x) is a GEM-tree on column x.

In much of the following discussion, we will simply use the term <u>GEM-tree</u>; it should be clear from the context which of these definitions we mean.

3.3.1.2 Stage 1.

In stage 1, we build a GEM-tree for a single column, X, for a single disjunct with disjunct number n. In the process, we eliminate redundancies among the predicates.

The input to this process is a sequence of predicate lists representing a predicate in cluster disjunctive normal form. Each list represents the predicates on a particular key column. Within the list, predicates are ordered by disjunct number. So, we will consume all predicates for a particular column and a particular disjunct each time we execute stage 1 processing.

In the algorithm below, G and Gtemp are GEM-trees on column X. GI represents a GEM-interval. While the algorithm executes, they hold intermediate results. On completion, G has the desired GEM-tree. The notation (n) denotes logic that is expanded in further detail later.

General Expression Method

```
G = <empty set>
If there are no predicates on this column
   G = { [lo,hi], {n} }                                    (1)
Else
   For each atom on column X
      Represent the atom as an interval I                  (2)
      GI = { I, {n} }
      Gtemp = { GI }
      While the OR flag is on                              (3)
         Advance to the next atom
         Represent it as an interval I                     (2)
         Gtemp = { I, {n} }
         Gtemp = Gtemp GEM-tree-union-1 { GI }             (4)
      End while
      G = G GEM-tree-intersection Gtemp                    (5)
   End for
End if
```

(1) This case can occur, for example, in a disjunct that has predicates on the first and third key columns but not the second.

(2) Representing an atom as an interval is described below. Recall that an atom is a predicate of the form <column> <op> <value>, where <op> is limited to <, <=, =, => or >, or it is <column> IS NULL. To make the pseudo-code easier to read, we represent <column> as X, and <value> as v.

```
Case
   Atom is X < v
      I = [lo,v)
   Atom is X <= v
      I = [lo,v]
   Atom is X = v
      I = [v,v]
   Atom is X >= v
      I = [v,non-null-hi]
   Atom is X > v
      I = (v,non-null-hi]
   Atom is X IS NULL
      I = [hi,hi]    (here, X is nullable, and hi is NULL)
End case
```

(3) Note that since a cluster is an OR of atoms on the same column, it will never be the case that the OR flag will be on and the next atom is for a different column.

To describe GEM-tree-union-1 and GEM-tree-intersection, denote the first GEM-tree as G1, the second as G2. G denotes a GEM-tree which during the algorithm holds an intermediate result. At termination, G holds the result GEM-tree. Denote the GEM-intervals of G as { I1, {n} }, ..., { Ik, {n} }, and the GEM-intervals of G2 as { J1, {n} }, ..., { Jm, {n} }. I denotes an interval, holding an intermediate result.

(4) GEM-tree-union-1 is described below:

47
                                        General Expression Method
```
G = G1
For j = 1, ..., m
   Find the first interval Imin that overlaps Jj              (4a)
   If such an interval exists
      Find the last interval Imax that overlaps Jj            (4a)
      Create a new interval I representing the union of Imin, ...,
        Imax and Jj                                           (4b)
      Replace { Imin, {n} }, ... , { Imax, {n} } in G with { I, {n} }
   Else
      Insert { Jj, {n} } into G in the appropriate order      (4c)
   End if
End for
```

(4a) Note that since the intervals are in order, if Imin overlaps Jj, and Imax overlaps Jj, then Ii overlaps Jj for i = min, ..., max. Further, if Imin is the smallest such and Imax the largest such, then no other intervals overlap Jj. Also, if min < k < max, Ik is in fact a subset of Jj.

Determining whether two intervals overlap is done in the way one would expect. We show below the logic for two closed intervals. Denote the intervals as I = [a,b] and J = [c,d]. Comparison is meant in the key order sense. The generalization to all intervals should be straightforward.

```
If b < c         (that is, if [a,b] lies before [c,d])
   The intervals do not overlap
Else if d < a    (that is, if [c,d] lies before [a,b])
   The intervals do not overlap
Else
   The intervals overlap
End if
```

(4b) Denote Imin as [a,b], Imax as [c,d] and Jj as [x,y]. Then the the union of Imin, ..., Imax and Jj is [min(a,x),max(d,y)]. Min and max are computed in key order sense. The generalization to all intervals, again, should be straightforward.

(4c) Note that as we iterate through Ik to find Imin, we stop when we find an interval that overlaps, or when we find an interval [a,b] that lies after Jj. In this case, we have stopped at precisely the proper point to insert Jj.

(5) GEM-tree-intersection is described below:

```
G = <empty set>
For i = 1, ..., k
   For j = 1, ..., m and while I is non-empty
      If Ii overlaps Jj
         Add the GEM-interval { Ii intersect Jj, {n} }        (*)
            to the end of G
      End if
   End for
End for
```

48

General Expression Method (*) Note that since G1 and G2 have their intervals in order, the result does also if we append to the end.

3.3.1.3 Stage 2.

In stage 1, we built a GEM-tree on a column X for a particular disjunct n. In stage 2, we glue these GEM-trees together. We do it step-wise: We take a GEM-tree for disjunct n and glue it to the GEM-tree for disjuncts 0, ..., n-1.

The stage 2 algorithm is simply a union of two GEM-trees. We call this operation GEM-tree-union-2. It is somewhat different than (and in fact is a generalization of) GEM-tree-union-1. The added complication is that the reference sets of the GEM-intervals are no longer identical.

Since we wish to remember which key values are generated by each disjunct, we treat overlapping GEM-intervals differently. We break out their intersections into new intervals, whose reference sets are the union of the originals.

As before, G1 and G2 denote the GEM-tree operands, G denotes a GEM-tree intermediate result. At termination, G holds the desired GEM-tree. { Ii, Ri } is the ith GEM-interval of G, while { Jj, Rj } is the jth GEM-interval of G2. Ix, Iy, Iz, Jx and J represent interval intermediate results.

GEM-tree-union-2 is described below:

```
G = G1
For j = 1, ..., m
  i = 1
  J = Jj
  While i <= k and Ii lies before J
    i = i+1
  End while
  While J is non-empty and i <= k and Ii overlaps J
    Ix = Ii "front-" J    (i.e. the part of Ii before J, if any)   (1)
    Jx = J "front-" Ii    (i.e. the part of J before Ii, if any)
    Iy = Ii intersection J
    Iz = Ii "back-" J     (i.e. the part of Ii after J, if any)    (2)
    J  = J "back-" Ii     (i.e. the part of J after Ii, if any)
    Replace GEM-interval { Ii, Ri } with the sequence assembled
        from the following:
        { Ix, Ri } if Ix is non-empty                               (3)
        { Jx, Rj } if Jx is non-empty
        { Iy, Ri union Rj }    (Iy is always non-empty)
        { Iz, Ri } if Iz is non-empty
    i = i + 1
  End while
  If J is non-empty
    Add GEM-interval { J, Rj } to G after I(i-1)
  End if
End for
```

8

49  General Expression Method (1) Ii "front-" J denotes that part of Ii that precedes J. If Ii is [a,b] and J is [c,d], it is computed as shown below. (The computation assumes that I and J are already known to overlap. This assumption shows up in the line (*).) The generalization to other kinds of intervals should be obvious.

```
If a < c
  Return [a,c)                    (*)
Else
  Return the empty set
```

(2) Ii "back-" J denotes that part of Ii that follows J. If Ii is [a,b] and J is [c,d], it is computed as shown below. (The computation assumes that I and J are already known to overlap. This assumption shows up in the line (*).) The generalization to other kinds of intervals should be obvious.

```
If d < b
  Return (d,b]                    (*)
Else
  Return the empty set
```

(3) Note that at most one of Ix and Jx will be non-empty. The sequence assembled consists of at most three GEM-intervals.

Note that GEM-tree-union-1 and GEM-tree-union-2 could be implemented by a single algorithm, if we added logic here to deal with the case where Ri = Rj. In Stage 1, Ri = Rj always (and in fact is a singleton, {n}). In Stage 2, Ri <> Rj always. To unify the two algorithms, we would change GEM-tree-union-2 to not break out the intersection of Ii and Jj into a separate interval if Ri = Rj, but instead simply glue Ii into Jj.

But, it is a little more CPU-efficient if we implement these as separate procedures (and avoid computing whether Ri = Rj).

3.3.1.4 An Example.

To help fix ideas, let us go through an example. Consider the following predicate on non-nullable key columns A, B, C:

```
(A between 1 and 100 AND
 B = 10 AND
 C < 30)
OR
(A between 65 and 120 AND
 B between 10 and 20 AND
 C >= 30)
OR
(A in (100,200) AND
 B >= 10)
```

1. First, we write this as a sequence of predicate lists. We number the disjuncts:

50                              General Expression Method

```
0 --> (A between 1 and 100 AND B = 10 AND C < 30)
1 --> (A between 65 and 120 AND B between 10 and 20 AND C >= 30)
2 --> (A in (100,200) AND B >= 10)
```

We get the predicate lists:

```
Column A                 Column B              Column C
--------                 --------              --------
0, >=, 1                 0, =, 10              0, <, 30
0, <=, 100               1, >=, 10             1, >=, 30
1, >=, 65                1, <=, 20
1, <=, 120               2, >=, 10
2, =, 100, OR-flag
2, =, 200
```

Notice we have replaced the 'betweens' and 'ins' with atoms. Notice also that in the third predicate list there is no predicate for disjunct 2.

2. We next build GEM-trees for disjunct 0. We start with column C. There is only one atom, C < 30, for disjunct 0, giving rise to the interval [lo,30). The resulting GEM-tree is:

Column C:
| Interval | Reference Set |
| [lo,30)  | { 0 }         |

Similarly, for column B, we get:

Column B:
| Interval | Reference Set |
| [10,10]  | { 0 }         |

The atoms on A in disjunct 0 give rise to the intervals [1,hi] and [lo,100]. Since the atoms are ANDed, we use GEM-tree-intersection on them to obtain [1,100]. The resulting GEM-tree on A for disjunct 0 is simply:

Column A:
| Interval | Reference Set |
| [1,100]  | { 0 }         |

3. Next we consider disjunct 1. We first build the GEM-tree for column C, obtaining

Column C:
| Interval | Reference Set |
| [30,hi]  | { 1 }         |

4. Next, seeing that this tree is non-empty, we do stage 2 processing to merge this tree into our result.

The GEM-intervals are { [lo,30), { 0 } } and { [30,hi], { 1 } }. These do not overlap, so the resulting GEM-tree is simply

10

General Expression Method

Column C:

| Interval | Reference Set |
|----------|---------------|
| [lo,30)  | { 0 }         |
| [30,hi]  | { 1 }         |

General Expression Method

5. We continue on, doing stage 1 processing for disjunct 1 on column B. We get:

Column B:

| Interval | Reference Set |
    |----------|---------------|
    | [10,20]  | { 1 }         |

6. We then do stage 2 processing, merging it with disjunct 0. We have the GEM-intervals { [10,10], { 0 } } and { [10,20], { 1 } }. These overlap, in fact [10,10] is contained in [10,20]. We break out the intersection of these two into a separate interval, with its reference set being the union of the originals. The resulting GEM-tree is

Column B:

| Interval | Reference Set |
    |----------|---------------|
    | [10,10]  | { 0, 1 }      |
    | (10,20]  | { 1 }         |

Notice that the interval [10,20] changed to (10,20]; we took out the part that overlaps [10,10].

7. We move on, to do stage 1 and then stage 2 processing for disjunct 1 on column A. Stage 1 processing yields:

Column A:

| Interval | Reference Set |
    |----------|---------------|
    | [65,120] | { 1 }         |

In stage 2, we have the GEM-intervals { [1,100], { 0 } } and { [65,120], { 1 } }. Again these overlap, but unlike with column B, one is not contained in the other. So, this time the result is three GEM-intervals:

Column A:

| Interval  | Reference Set |
    |-----------|---------------|
    | [1,65)    | { 0 }         |
    | [65,100]  | { 0, 1 }      |
    | (100,120] | { 1 }         |

8. Next, we process disjunct 2. There are two new twists here. Column C has no predicates, so we generate a GEM-interval containing [lo,hi]. Column A has a cluster consisting of two atoms. This shows GEM-tree-union-1 processing. A = 100 gives rise to the interval [100,100], while A = 200 gives rise to [200,200]. They do not overlap. So, both result in entries in the GEM-tree. The GEM-tree (for all columns) is as follows:

52          General Expression Method

```
Column C:
Interval        Reference Set
 [lo,hi]          { 2 }

Column B:
Interval        Reference Set
 [10,hi]          { 2 }

Column A:
Interval        Reference Set
 [100,100]        { 2 }
 [200,200]        { 2 }
```

We merge them in stage 2 processing as before, doing C first and A last. Finally we obtain:

```
Column A:
Interval        Reference Set
 [1,65)           { 0 }
 [65,100)         { 0, 1 }
 [100,100]        { 0, 1, 2 }
 (100,120]        { 1 }
 [200,200]        { 2 }

Column B:
Interval        Reference Set
 [10,10]          { 0, 1, 2 }
 (10,20]          { 1, 2 }
 (20,hi]          { 2 }

Column C:
Interval        Reference Set
 [lo,30)          { 0, 2 }
 [30,hi]          { 1, 2 }
```

3.3.2 GEM-tree Traversal

During GEM-tree traversal, we generate the key values that satisfy the original predicate. We may enumerate all possible values (the "dense" algorithm), or we may skip values known not to exist in the base table (the "sparse" algorithm).

First, we describe the GEM-tree traversal algorithm in general, then we describe its "dense" and "sparse" variants.

3.3.2.1 The GEM-tree Traversal Algorithm.

We give two descriptions of the algorithm. The first is a conceptual one: It shows how we iterate over the set of key values. We don't implement this algorithm directly, since we want to interleave this iteration with fetch processing in general. The second description reformulates the algorithm in a way that admits this interleaving. The second description is what is actually implemented.

General Expression Method

53

Conceptually, we can express GEM-tree traversal as a recursive procedure. Below, G is a GEM-tree on n columns (on each recursive call, n is effectively decremented). R is a reference set (an accumulation of context that tells us which disjuncts the partial key value satisfies). PK is a partial key; it is a selection of key values from higher level invokations of the procedure.

```
Traverse(G, R, PK):

For each GEM-interval { Ii, Ri } of the first column of G
    Rx = R intersect Ri                                        (1)
    If Rx is non-empty
      If there are more columns in G
        For each value V in the interval Ii                    (2)
          Traverse (G minus its first column, Rx, PK || V)     (3)
        End for
      Else
        Denote Ii as [a,b]                                     (4)
        Emit the begin key value PK || a
        Emit the end key value PK || b
      End if
    End if
  End for
```

The arguments to Traverse are a GEM-tree G, a reference set R, and a partial key, PK. In the mainline code, we call Traverse with the arguments (G, <empty set>, <empty key>), where G is our original GEM-tree.

(1) By taking the intersection, we find values of the current key column that might appear with values of prior columns. If we don't carry this context along, we may generate key values that do not satisfy the original predicate.

(2) This iterator may be the "dense" or "sparse" algorithm. The dense algorithm enumerates all possible values in the interval, while the sparse algorithm may skip over values that don't in fact exist in the base table. We may use dense on some columns and sparse on others, independently.

(3) The recursive call in effect traverses to the next column of the GEM-tree.

(4) The algorithm shows treatment for a closed interval. If it is open, we set the after flag for the begin key and the before flag for the end key. The generalization to semi-open intervals is straightforward.

Next, we recast this algorithm in a way that allows it to interleave with fetch execution. We unwind the recursion by associating a context with each column. The information in this context contains:

o  the current GEM-interval, if any - denoted C_Intv

General Expression Method o the current value within that interval - i.e. the value returned for this column on the last call to the iterator - denoted C_Val o the intersection of the reference sets of the columns to the left given their current GEM-intervals - denoted C_Ref Also, for the GEM-tree as a whole, we keep track of the first column that does not have a current GEM-interval. This is denoted below as C_Col, and we represent it numerically, i.e. 1 means the first column does not have a current GEM-tree interval, 2 means the first one does, but not the second, and so on. We assume the GEM-tree has n columns. We use the convention that C_Col = n+1 means all columns have a current GEM-interval, and that C_Col = 0 means that we have finished traversing the GEM-tree (i.e. we have hit End-of-File).

(Aside: The implementation might use an array index or pointers or some other physical representation for C_Col. We don't mean to imply that a GEM-tree must be represented as an array.)

We define three methods: Traverse_init, Traverse_next, and Traverse_end.

Traverse_init:

```
C_Col = 1
Column[1].C_Intv = none
Column[1].C_Ref = the set of all possible disjuncts
```

General Expression Method

55

```
Traverse_next:

While C_Col > 0 and we don't have a key value to return
    If Column[C_Col].C_Intv = none
      Find the first GEM-interval in this column, ( I, R ),
        such that R intersect Column[C_Col].C_Ref is non-empty    (1)
      Column[C_Col].C_Intv = ( I, R )
      If C_Col < n
        Column[C_Col].C_Val = first value in I                    (2)
      End if
      C_Col = C_Col + 1
      If C_Col = n+1
        Set begin key                                             (3)
        Set end key                                               (4)
      Else
        Column[C_Col].C_Intv = none
      End if
    Else
      If C_Col = n
        Find the next GEM-interval ( I, R ) such that R
          intersect Column[C_Col].C_Ref is non-empty
        If one exists
          Column[C_Col].C_Intv = that interval
          Set begin key                                           (3)
          Set end key                                             (4)
        Else
          C_Col = C_Col - 1
        Endif
      Else
        Find the next value in Column[C_Col].C_Intv               (5)
          after Column[C_Col].C_Val
        If one exists
          Column[C_Col].C_Val = that value
          C_Col = C_Col + 1
          Column[C_Col].C_Intv = none
        Else
          Find the next GEM-interval ( I, R ) such that R
            intersect Column[n].C_Ref is non-empty
          If one exists
            Column[C_Col].C_Intv = ( I, R )
            Column[C_Col].C_Val = first value in I
            C_Col = C_Col + 1
          Else
            C_Col = C_Col - 1                                     (6)
          End if
        End if
      End if
    End if
  End while
  Return begin/end key or EOF indication Traverse_end:

C_Col = 0
```

General Expression Method (1) Note that there will always be at least one. This is because we merged in the disjuncts starting at the last column and ending at the first. If the GEM-tree on some column for a given disjunct is empty, we stop merging - so that disjunct never shows up in a reference set on the first column.

(2) If I = [a,b] or [a,b), the "first value in I" is a. If I = (a,b] or (a,b), the "first value in I" is the next value after a. The next value may be determined via either the dense or sparse algorithms. We don't need to compute C_Val for the rightmost column, because we will use the current interval endpoints directly in key construction (with appropriate after and before flag settings).

(3) The begin key is composed of the concatenation of the current values of all but the rightmost column, and the begin point of the current interval I for the rightmost column. If I is (a,b] or (a,b), the after flag is set. Otherwise it is not set.

(4) The end key is composed of the concatenation of the current values of all but the rightmost column, and the end point of the current interval I for the rightmost column. If I is [a,b) or (a,b), the before flag is set. Otherwise it is not set.

(5) The next value may be determined via either the dense or sparse algorithms.

(6) Note that if C_Col goes to 0, we have reached End-of-File on the GEM tree.

The begin and end keys returned by Traverse-next can be used to define a subset via DM^START (or DM^KEYPOSITION). Fetch processing can then iterate over this subset. Once the subset is exhausted, fetch processing calls Traverse-next to find the next subset.

3.3.2.2 Dense Algorithm.

We use the dense algorithm to traverse an interval when we think the number of actual values in the base table is nearly the same as the number of possible values in the interval.

To obtain the next current value, we simply "add one" to it. "Adding one" depends on the datatype and key direction.

If the key direction is ascending, "adding one" really is in a sense adding one. For integer, decimal, datetime and interval datatypes, we simply add one to the least significant digit. For fixed length character datatypes without a collation, we treat the character string as a whole as one large integer, and increment the least significant byte. For varying length character strings, we treat them as if they are blank padded out to maximum length, and then treat them as we would fixed length character strings.

Note that if a column is nullable, adding one to non-null-hi must give us NULL.

General Expression Method

If the key direction is descending, we subtract one instead. (There are other considerations for descending keys as well. See the section, "Descending Keys", below.)

We do not support the dense algorithm for floating point datatypes. We may choose not to support the dense algorithm for some other datatypes.

Collations could be supported if we use the procedure CPRL_GETNEXTINSEQUENCE_ to "add one." This only works for ascending keys however; there is presently no procedure that goes backwards. For now, though, collations will not be supported in the dense algorithm because there is no easy and efficient method today for the Optimizer to determine the number of distinct possible strings of length n given a particular collation. (Such a method is not hard to come by; it's simply outside the scope of this project.)

3.3.2.3 Sparse Algorithm.

We choose the sparse algorithm to traverse an interval when we think the number of actual values in the base table is small relative to the set of all possible values. That is, we use it when we expect gaps in the ranges specified for the key column. The Optimizer detects this by analyzing the UEC and row count of the table.

We will use the sparse algorithm always for datatypes such as float and interval.

To find the next value, we open a subset with begin key using the current value (C_Val) with the after flag set. The end key is the end point of the interval (with before flag set if the end point is open). We then do a DM^GET: If it completes successfully, the value retrieved is the next value in the interval actually present in the base table.

The pseudo-code for this algorithm is as follows:

```
Set begin key                                    (1)
Set end key                                      (2)
Issue DM^START (or DM^KEYPOSITION)
Issue DM^GET
If successful
  C_Val = value retrieved for this column
End if
Return C_Val or EOF indication
```

(1) The begin key is the concatenation of the current value (C_Val) of the columns to the left and this column and hi for columns to the right, with the after flag set. Given that the current column is column c, the pseudo-code below describes this:

General Expression Method

```
For i <= c
  Begin key[i] = Column[i].C_Val
End for
For i > c and i <= n
  Begin key[i] = hi
End for
Set after flag
```

Recall also that hi is NULL if the column is nullable.

(2) The end key is the concatenation of the current value (C_Val) of the columns to the left, and the end point of the current interval. (We could, in fact, scan across succeeding intervals whose reference sets intersect C_Ref in a non-empty way, but for simplicity we do not discuss that optimization here.) If the end point is excluded, we use lo for columns to the right and set the before flag. If it is included, we use hi and do not set the before flag.

Given that the current column is column c, the pseudo-code below describes this:

```
For i < c
  End key[i] = Column[i].C_Val
End for
End key[c] = end point of Column[c].C_Int
If the end point of Column[c].C_Int is included
  For i > c and i <= n
    End key[i] = hi
  End for
  Reset before flag
Else
  For i > c and i <= n
    End key[i] = lo
  End for
  Set before flag
End if
```

Once again, recall that hi is NULL if the column is nullable.

It should be observed that the dense algorithm has no I/O cost when traversing to the next value. The sparse algorithm, on the other hand, does involve I/O cost: We start a subset, and do one retrieval.

3.3.2.4 An Example.

To illustrate the algorithms above, we give an example. Here we focus on the traversal algorithm itself, largely ignoring the question of getting the next value in a given column. In the appendix, we go over the example again, with emphasis on the latter issue.

Recall the example given for GEM-tree construction. We have the original predicate 59    General Expression Method

```
(A between 1 and 100 AND
 B = 10 AND
 C < 30)
OR
(A between 65 and 120 AND
 B between 10 and 20 AND
 C >= 30)
OR
(A in (100,200) AND
 B >= 10)
``` and its associated GEM-tree

Column A:
| Interval | Reference Set |
|---|---|
| [1,65) | { 0 } |
| [65,100) | { 0, 1 } |
| [100,100] | { 0, 1, 2 } |
| (100,120] | { 1 } |
| [200,200] | { 2 } |

Column B:
| Interval | Reference Set |
|---|---|
| [10,10] | { 0, 1, 2 } |
| (10,20] | { 1, 2 } |
| (20,hi] | { 2 } |

Column C:
| Interval | Reference Set |
|---|---|
| [lo,30) | { 0, 2 } |
| [30,hi] | { 1, 2 } |

At Traverse-init time, we set C_Col = 1, and Column[1].C_Intv = none and Column[1].C_Ref = { 0, 1, 2 }.

On the first call to Traverse-next, we see the following processing:

1. We scan the intervals for column A looking for the first one whose reference set has a non-empty intersection with Column[1].C_Ref. Note that since Column[1].C_Ref has <u>all</u> disjuncts in it, then all intervals qualify. So, we stop at the first one, [1,65).

We set Column[1].C_Intv = [1,65) and Column[1].C_Val to 1.

We increment C_Col to 2, and initialize Column[2].C_Intv to none. We set Column[2].C_Ref to the intersection of Column[1].C_Ref and the reference set associated with [1,65). So, Column[2].C_Ref gets {0}.

2. We next scan the intervals of column B looking for the first one whose reference set has a non-empty intersection with Column[2].C_Ref (i.e. {0}). The first (and only) such interval is [10,10].

General Expression Method

We set Column[2].C_Intv = [10,10] and Column[2].C_Val to 10.

We increment C_Col to 3, and initialize Column[3].C_Intv to none. We set Column[3].C_Ref to the intersection of Column[2].C_Ref and the reference set associated with [10,10]. So, Column[3].C_Ref gets {0}.

3. Finally, we scan the intervals of column C looking for the first one whose reference set has a non-empty intersection with Column[3].C_Ref (i.e. {0}). We find the interval [lo,30).

We set Column[3].C_Intv = [lo,30).

Since C is the rightmost column, we assemble the begin and end keys. The begin key is (1,10,lo) and the end key is (1,10,30) with the before flag set. We exit Traverse_next.

4. Fetch processing now retrieves all the values between keys (1,10,lo) and (1,10,30). When complete, it calls Traverse_next again.

5. In Traverse_next, we see that C_Col is 3, and Column[3].C_Intv = [lo,30). So, we look for the next interval whose reference set has a non-empty intersection with Column[3].C_Ref (i.e. {0}). There aren't any more, so we backtrack, setting C_Col = 2.

6. In Column B, we look for the next value in Column[2].C_Intv (= [10,10]) after Column[2].C_Val (= 10). There aren't any, so we are done with this interval.

7. So, we look in Column B for the next interval after [10,10] whose reference set has a non-empty intersection with Column[2].C_Ref (i.e. {0}). There is none, so again we backtrack, setting C_Col = 1.

8. In Column A, we look for the next value in Column[1].C_Intv (= [1,65)) after Column[1].C_Val (= 1). Assuming dense algorithm, the next value is 2. So, we set Column[1].C_Val to 2.

We increment C_Col to 2, and initialize Column[2].C_Intv to none. We set Column[2].C_Ref to the intersection of Column[1].C_Ref and the reference set associated with [1,65). So, Column[2].C_Ref gets {0}.

9. We continue, as before, to Column C, returning the begin and end key values (2,10,lo) and (2,10,30) with before flag set.

10. By similar processing, we generate the subsets with begin key (k,10,lo) and end key (k,10,30) with before flag set for k = 3, ..., 64.

11. When we backtrack to column A with Column[1].C_Val = 64, we see that the interval [1,65) is exhaused and move to the next interval, [65,100).

61   General Expression Method

This time, when we set C_Col to 2, Column[2].C_Ref gets set to {0,1}.

12. When we get to column C, note that Column[3].C_Ref gets {0,1}. We generate the begin key (65,10,lo) and (65,10,30) with before flag set.

13. On the next call to Traverse_next, we find that the interval [30,hi] also has a reference set with non-empty intersection with Column[3].C_Ref. So, we generate the begin key (65,10,30) and end key (65,10,hi), this time without the before flag set.

14. On the next call to Traverse_next, we don't find any more intervals in Column C. We backtrack to Column B. We exhausted all values in the current interval, [10,10], so we look for the next interval whose reference set has a non-empty intersection with Column[2].C_Ref (i.e. {0,1}). The next such interval is (10,20]. Since it excludes the begin point, we set Column[2].C_Val to the next value, 11.

We set C_Col = 3, and Column[3].C_Ref gets the intersection of Column[2].C_Ref (i.e. {0,1}) and the reference set of (10,20] (i.e. {1,2}). So, Column[3].C_Ref gets {1}.

15. We find the first interval for Column C whose reference set has a non-empty intersection with {1}. The only such interval is [30,hi]. So, we generate the begin key (65,11,30) and end key (65,11,hi).

16. Similarly, we generate begin/end keys (65,m,30) and (65,m,hi) for m = 12, ..., 20.

17. When we exhaust the interval (10,20] in column B, we see that there are no more intervals for B whose reference sets have a non-empty intersection with Column[2].C_Ref (i.e. {0,1}), so we backtrack again to Column A.

Continuing in this way, we generate begin/end keys (k,10,lo) and (k,10,30) with before flag set and (k,m,30) and (k,m,hi) for k = 66, ..., 99 and m = 10, ..., 20.

18. When we next backtrack to Column A, we advance to the interval [100,100]. This time, Column[2].C_Ref gets {0,1,2}. This will cause us to traverse all of the intervals for Column B. Since {2} is in the reference sets on all B intervals and C intervals, we will generate keys for all combinations of these.

19. When we next backtrack to Column A, we advance to the interval (100,120]. Now Column[2].C_Ref gets {1}. The begin/end keys generated will be (k,m,30) and (k,m,hi) for k = 101, ..., 120 and m = 10, ..., 20. The Column B interval (20,hi] is skipped because 1 is not in its reference set. The Column C interval [lo,30) is skipped because 1 is not in its reference set.

21

General Expression Method

20. When we next backtrack to Column A, we advance to the interval [200,200]. Column[2].C_Ref gets {2}. Since 2 appears in the reference sets of all intervals in Columns B and C, we get all combinations.

21. When we backtrack to Column A again, there are no more intervals so C_Col is set to 0. This results in an EOF return from Traverse_next. Fetch processing terminates.

The reader may verify that the keys we generated correspond to the following predicate:

```
(A >= 1 and < 65 AND B = 10 AND C < 30) OR
(A >=65 and < 100 AND B = 10) OR
(A >=65 and < 100 AND B > 10 and <=20 AND C >= 30) OR
(A = 100 AND B >= 10) OR
(A > 100 and <= 120 AND B >=10 and <= 20 AND C>=30) OR
(A = 200 AND B >= 10)
```

This is just the original predicate, re-expressed in cluster disjunctive normal form.

3.3.3 Descending Keys

In the discussion above, we have mostly assumed, for simplicity's sake, that keys are ascending. To make the algorithms work for descending keys, a few changes can be made. The algorithm for converting atoms to intervals should read:

```
Case
   Atom is X < v
     I = (v,lo]
   Atom is X <= v
     I = [v,lo]
   Atom is X = v
     I = [v,v]
   Atom is X >= v
     I = [non-null-hi,v]
   Atom is X > v
     I = [non-null-hi,v)
   Atom is X IS NULL
     I = [hi,hi]   (here, X is nullable, and hi is NULL)
End case
```

We have just swapped the endpoints of the intervals (being careful to carry the open/closed attributes along when swapping).

Also, in stage 1 processing of GEM-Tree construction, if there are no predicates on the column, we generate the interval [hi,lo] instead of [lo,hi].

Finally, when building begin and end keys, we supply lo instead of hi and hi instead of lo for columns after the subset interval column.

General Expression Method (Note: Conv^Build^Key^Buffer does this for us if it is told the key direction.)

In other parts of the discussion, we understand comparison to mean key order, so the algorithms are correct as written.

3.3.4 Proof of Correctness

In this section, we show that the keys generated in a GEM-tree traversal satisfy the original predicate, and that all key values in the base table satisfying the original predicate are generated by the GEM-tree traversal.

Theorem (The Jain-Leslie-Yaghmai-Birdsall algorithm): Any predicate P on key columns involving comparison to outer values and IS NULL predicates may be represented as a GEM-tree. GEM-tree traversal generates only key values that satisfy P. It generates key values that can be used to retrieve all rows from the base table that satisfy P.

Proof: Let P be a predicate whose atoms are comparisons of key columns to outer values. (By "outer value" we mean a value that does not depend on the table being scanned.) If some atom is of the form X <> value, replace it with the predicate (X < value) OR (X > value).

Note that any predicate P can be expressed in disjunctive normal form. Note also that any tree in disjunctive normal form is also in cluster disjunctive normal form. Therefore P can be expressed cluster disjunctive normal form and we can use the construction given in the previous sections. For the remainder of this discussion, we assume P is so expressed.

Construct the GEM-tree, G from P. Let Kp denote the set of key values in the base table that satisfy P, and let Kg denote the set of key values returned via GEM-tree traversal and fetch processing. We want to show, then, that Kp = Kg.

First we show Kg is contained in Kp.

Suppose during GEM-tree traversal we return begin/end keys (k1, ..., k(n-1), bn) and (k1, ..., k(n-1), en). We want to show that all rows in this subset satisfy P.

Recall that bn and en come from the end points of an interval I on the rightmost key column. Consider its reference set R. Now, by our construction, the intersection of R and Column[n].C_Ref must be non-empty. Let j be an element of this intersection. We will show that the rows from the subset satisfy disjunct j of P.

Observe that since for all i, Column[i+1].C_Ref is the intersection of Column[i].C_ref and the reference set of Column[i].C_Intv, then j must be an element of all of these, for i = 1, ..., n.

General Expression Method

64

Denote the first key column as A. Observe that k1 is an element of Column[1].C_Intv, the current interval of column A. Denote this interval as J. Recall that the intervals in the final GEM tree are subsets of some intervals in GEM trees constructed for each disjunct. In particular, since j is in the reference set of J, J must be a subset of some interval Jj in the GEM tree built for disjunct j. Thus, k1 is an element of Jj.

Consider how Jj was created. In general it is the intersection of unions of intervals derived from atoms of disjunct j. We took intersections for ANDs and unions for ORs underneath these ANDs. Suppose Jj = intersection of K1, K2, ..., Kk. Then, k1 is an element of all of these. Further, each Ki is a union of L1, ..., Lli of intervals derived from atoms. Thus, k1 is an element of some Lji for each Ki. But, then, k1 satisfies some atom in that OR list (the OR list may consist of only one atom), for all operands of the AND (again the AND list may consist of only one atom, or just of an OR list). But, then, k1 satisfies the predicates in disjunct j, and therefore the original predicate P.

Similar reasoning shows that k2, ..., k(n-1), and the values from bn to en satisfy P. Therefore, all rows from the subset satisfy P. Thus, Kg is contained in Kp.

Next we show that Kp is contained in Kg. Let (k1, ..., kn) be the key of some row in the base table that satisfies P. Then, it must satisfy some disjunct of P. Suppose it satisfies the jth disjunct.

We claim that k1 is in some interval in the GEM-tree for column A for disjunct j. Write the predicates of disjunct j on A as

(Atom[1][1] OR ... OR Atom[1][j1])
  AND
  ...
  AND
(Atom[m][1] OR ... OR Atom[m][jm])

Since k1 satisfies P, we know that for i = 1, ..., m there is some atom Atom[i][j] such that k1 satisfies Atom[i][j]. These atoms give rise to intervals containing k1. The union of intervals representing Atom[i][1] OR ... OR Atom[i][ji] therefore contains k1 for all i. Therefore, k1 is in some interval in the intersection of these unions. That is, k1 is in some interval, call it Jj, of the GEM-tree for column A for disjunct j. The reference set for this interval is {j}.

When this GEM-tree is merged into the final GEM-tree, Jj will give rise to one or more intervals in the final tree. Their union is precisely Jj. In particular, j will be in the reference set for each of these intervals. Thus, k1 is in some GEM-interval for column A in the final GEM-tree, and the reference set for that GEM-interval will contain j.

Similar reasoning shows that the other key column values, k2, ..., kn, are also elements of some GEM-interval on their respective General Expression Method columns, and the reference set on each of these contains j. Denote these intervals as I1, I2, ... In.

During Traverse_next, we will at some point traverse the interval I1 and therefore the value k1. When traversing the second column, I2's reference set will have a non-empty intersection with Column[2].C_Ref (since both will contain j). While traversing I2, then, we will traverse the value k2. And so on to the nth column. In the nth column, we will generate a begin/end key pair of the form (k1,k2, ..., k(n-1),bn) and (k1,k2, ..., k(n-1),en), where bn and en are the endpoints of In. Since kn is contained in In, it follows that rows with key values (k1,...,kn) will be retrieved in this subset. Therefore, Kp is contained in Kg.

Having shown containments in both directions, Kg = Kp and the theorem is proven.

QED.

3.3.5 Further Refinement

In this section we discuss some refinements that are in discussion at this writing but not completely thought out. These will be implemented if time permits.

3.3.5.1 Disjuncts Lacking Predicates on Rightmost Keys.

The algorithms given do suffer from (at least) one inefficency. If some disjunct does not have a predicate on the rightmost column, we will needlessly start a subset for each value in the next column to the left. We could instead simply treat the next column to the left as the rightmost column in this case - creating a single subset for each interval in that column.

This optimization could be carried to n levels: if there are no predicates on the rightmost n columns in some disjunct, we can do subset processing directly on intervals in the next column to the left.

The basic idea is as follows:

Given a disjunct j, let Xj be the rightmost key column that has a predicate. In the GEM-tree for Xj on disjunct j, set a flag in all the intervals saying these are subset intervals.

In the stage 2 algorithm, any interval generated from subset intervals is also a subset interval. So, in general, subset intervals can arise in several columns. (Indeed, we can think of all the intervals on the rightmost column as being subset intervals.)

In the traversal algorithm, we treat any subset interval as a subset, instead of traversing the values in that interval. That is, we don't traverse to the next column if the subset flag is set. Instead we supply hi and lo values for the missing key columns.

66                        General Expression Method

A complication arises if in Stage 2 an interval is derived from the intersection of a subset interval and a non-subset interval. We can use it as as subset only for the disjunct that it is a subset interval for. So, we need more than just a subset flag; we need at least to keep a second reference set detailing which disjuncts the interval is a subset interval for.

It is not yet clear that this is sufficient, however. More thought needs to go into understanding this refinement.

This refinement will be implemented if time allows.

3.3.5.2 Leverage from Sparse Algorithm.

If we use the sparse algorithm on some column X, we will also get values back for the columns to the right of X when doing the DM^GET. We can use these values as starting points when we traverse to columns after X. This may sometimes save us from generating keys that don't exist.

3.3.6 Non-Key Predicates

The GEM-tree algorithms generate keys for retriving values from a base table. It may be that there are non-key predicates involved as well. We can support these easily by generating a base table EXD representing the entire predicate, and sending that to DP2.

If the original predicate has the form (Key predicates) AND (Non-key predicates)

we can, as an optimization, generate an EXD for just the non-key predicates since they apply independently on all rows. In particular, if there are no non-key predicates at all (that is, if all the predicates are key predicates), we can dispense with the EXD altogether.

3.4 Optimizer Processing

The optimizer must take a parse tree and recognize when GEM index use extensions will result in a more cost effective way of accessing data. The GEM extensions consists of allowing range predicates used in an index to be followed by other key column predicates, and allow the general use of OR index access to be extended to joins.

The two extensions highlight the two major limitations we have today in the use of indexes. We currently only consider using additional parts of the key if the previous part of the key used only equality predicates, and do not consider the case of missing prediates at all. In addition OR index processing is resticted to when only one table is specified in the FROM clause.

General Expression Method

67

The optimizer will create the equivalent of disjunctive normal form, in a way that uses little memory. It assigns predicates to clusters. All predicates connected by only ANDs form a cluster. A single column IN list will also form a cluster (an IN list is a set of predicates, all on the same column, and ORed together, e.g. A IN (1,2,3) OR A=7 is equivalent to A=1 OR A=2 OR A=3 OR A=7).

Each cluster is represented by a cluster structure. Each predicate info table will point to the cluster entry it is a part of. Each cluster can be ORed to other clusters, and the result can be ANDed or ORed with other sets of clusters. We will materialize each disjunct of the expression (disjunctive normal form) and add the disjunct number to a list hanging off the cluster entry. We do not keep the disjunct after materializing it. Now we know which predicates participate in which disjuncts.

A paper describing this process is in $sqldoc.gemdoc.disjunct. It is in PC format and can be printed by FUP COPY \tess.$sqldoc.gemdoc.disjunct, $s.#pscrpt?, unstructured The ? in $s.#pscrpt? will be the printer number.

3.4.1 Use of Predicate Lists in the Optimizer

A search tree exists for every index of every table in the query. These are combined in various ways to do joins. Each time a new search tree is created a list of predicates appropriate to that search tree is created.

Each entry in this list points to a predicate info table entry, which in turn points to the predicate. In addition this predicate info entry will now point to a cluster entry which has a list of disjuncts this predicate participates in. In order to find out if we have a usable predicate for a particulat disjunct we only have to find it in this ordered list of disjuncts.

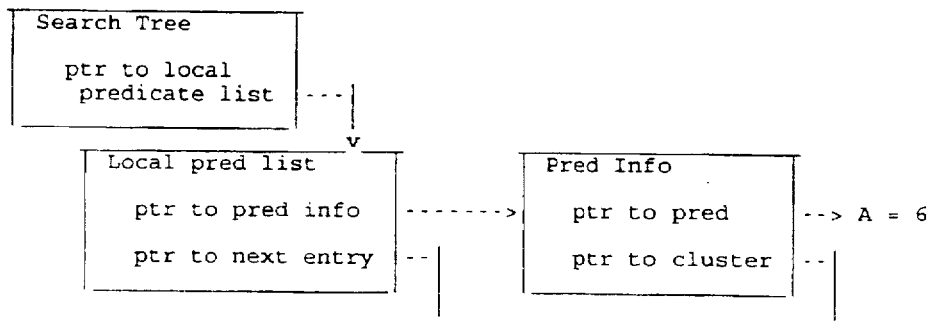

27

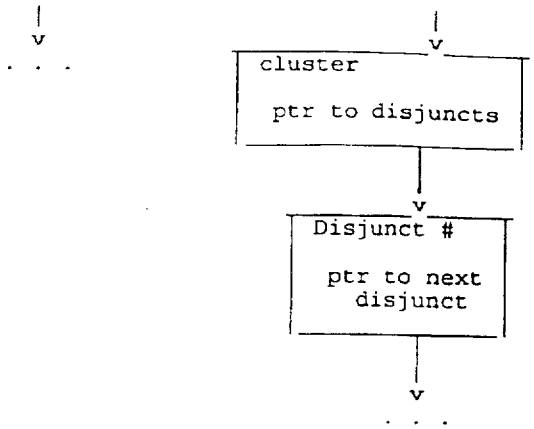

General Expression Method

3.4.2 Handling of Range Predicates in the Optimizer

The way range predicates are handled will be changed for this project. Begin and End range predicates will be recognized for each search tree's predicate list. These will be pointed to each other through the predicate info table. Wherever selectivity is calculated for these predicates in the optimizer will be changed to use the following formula when constants are used to limit the range:

sel1 + sel2 - notnull^selectivity

The begin/end selectivity will only be calculated for the > or >= operator.

The search key array will be changed to point to the > or >= predicate only. (Currently it will add both to the end of the key list.) Now the key list will contain only one reference per column.

3.4.3 Building the Path Pred Lists

The path pred lists in the optimizer are a list of potential predicates for an index. Currently we stop building after we process a column that has not equality predicate for it. We will now continue to the last key column, even if no predicate exists for a column.

Single column OR list type predicates will be chained together, so they appear similar to a single predicate in the list.

Range predicates are also chained (although through the pred info table), so they also appear similar to a single predicate in the list.

69              General Expression Method

3.4.4  Choosing Predicates for an Index

Each search tree represents a path (index). For each search tree we try to assign index predicates and cost that use of the index.

There are two aspects to this. One involves using multiple ranges and single column OR lists for a key. The other involves costing each disjunction separately.

3.4.5  Multiple Ranges and Single Column OR Lists in a Key

The optimizer will use costing to determine how many keys of the index can be used using GEM. We will always get the pre GEM cost first and then add GEM extensions in several steps, to ensure that each key column added for GEM will result in a cheaper index.

For example consider the following key predicates (key is on columns a, b, c and d):

WHERE a BETWEEN (1 and 5) AND b = 5 AND c IN (1,5,7) AND d<4;

The pre GEM index selection will only include the BETWEEN (1 and 5) for column a. After this has been costed by the optimizer, additional key predicates will be added to the key list. The b=5 and c IN (1,5,7) predicates will be added. This will be costed by the optimizer and the cost compared to the pre GEM cost. If it is still cheaper we will try to add the last predicate to the key list and cost it again. If still cheaper we will let this stand as the key.

3.4.6  Handling Disjunctions in the Optimizer

The predicate tree for the current query has been processed to set up a list of disjuncts off each cluster. If there is more than one disjunct, then for each index we must go through all the disjuncts (up to the pre GEM costing limit).

Within each disjunct a key can have multiple ranges and in lists. These are processed within each disjunct.

When we have disjuncts we still must find the pre GEM cost. The cost here involves only predicates that are common to all disjuncts.

After we have the pre GEM cost we now will process each disjunct separately. The total cost for all disjuncts will be accumulated. Whenever the total cost for all disjuncts equals or exceeds the pre GEM cost we quit and use the pre GEM index.

The optimizer will need to take care of the following for each disjunct:

General Expression Method

* Calculating Selectivity (opta^table^selectivity):

Only predicates for the current disjunct can be considered.

Disk process predicates can only be predicates that are in all the disjuncts.

* Determining Locking and SBB:

Sequential Block Buffering must be separately determined for each disjunct. For each disjunct check if a different type of sequential block buffering was chosen. If so keep only one type with following priority: Real SBB, Virtual SBB, No SBB. (Real will be chosen over Virtual SBB.)

The type of locking can only be decided after we have determined the total number of records that will be returned from the disk process. After all the disjuncts have been processed a new determination of locking will be made.

3.4.7 Implementation - Choosing Index Predicates

I will add the call to join costing to opta^table^cost and change this procedure to a loop that does the following:

* Cost the index as it currently would be today.

* Check if more keys could be added to this using gem.

- Loop over the disjuncts, by passing a disjunct number to the procedure that chooses predicates for the key.

- For each disjunct start with the last set of predicates for the key and try to add more key columns. Stop each time a new range is added.

- If any key columns have been added cost it and compare it to the last set. If the previous set was cheaper, revert to it and go on to the next disjunct.

- If this use of the index is cheaper than the last continue to try to add key columns.

- Reuse the search key array for each disjunct.

- For each disjunct check if a different type of sequential block buffering was chosen. If so keep only one type with following priority: Real SBB, Virtual SBB, No SBB. (Real will be chosen over Virtual SBB.)

- For each disjunct add the cost of the previous disjunct to a running total. Stop when the cost exceeds pre GEM costing.

General Expression Method

Some disjuncts may be logically impossible and should not be counted as accesses. (The executor will eliminate logically impossible disjuncts.)

The optimizer will eliminate disjuncts that it believes will probably not result in a retrieval. (These disjuncts are only eliminated for costing purposes.)

The optimizer will look for multiple equal predicates on the same column. If these are compared to different constants or host variables we will eliminate the disjunct.

When a GEM key has a sparse range in it a bit will be set in the search tree to tell the optimizer to return the key columns in a read.

GEM will be always be allowed for nested joins, but not for KS merge joins.

3.4.8 Costing

There are two costing routines that are affected (opta^table^cost and opta^join^cost^nested). Both of these will be modified to handle ranges that are followed by other predicates and single column OR lists.

A range that has following predicates will be costed by calculating the number of unique values within the range (selectivity times unique entry count). This is the number of positions we must do. A single column OR list will be costed by counting the number of equal predicates in the OR list. For any single column OR list predicate that is not an equal operator we must estimate the number of positions we must do. The total of equal predicates and estimated postitions is the number of positions we must do. We multiply the number of positions for each column together. We then multiply this times how much it costs if we have equals for the range and in list columns.

There are two types of positionings. One occurs when the values for the column are densely packed and numeric (not floating point). In this case the executor will just add one to the value. The other case occurs when the data is not densely packed. In that case we do a keyposition probe to find the next value for the column and then another keyposition to find the next row we want. The sparse algorithm is twice as costly as the dense algorithm.

This extra cost for the sparse algorithm needs to be added to the cost. However since the same predicate could appear in the leading column multiple times we do not need to cost this multiple times. We will check the clusters disjunct list to see if an earlier disjunct had already costed this leading range or if any disjunct had no predicate for this column (meaning we have to go through all the values in the column anyway).

General Expression Method

There is a fixed cost to the executor for building the GEM trees. This cost will be a function of the number of disjuncts and key columns used. For joins this cost must be multiplied by the number of outer records.

3.4.9 Use of Search Key Array

The search key array is used in several places in the compiler. Most of these places will need minimal changes to handle GEM additions. In general a join that uses GEM features does not preserve order, while an outer table that uses GEM does preserve order.

3.4.10 Interface with the Generator

The creation of the Begin/End Key structures is different with GEM. First we did not save all the search key arrays, only the last one. Also the search key array has only selected predicates not all the predicates for a column. The disjuncts must be recreated and all the predicates for a column listed.

The begin/end key structure for GEM will point to a three tiered structure. The first tier is general information about the column. It contains pointers to the next tier and back to the first tier for each disjunct.

The second tier contain compact list of pointers to predicate chains.

The third tier contains list of predicates for a single column that is in a single cluster. The second tier links multiple clusters together. In this way if a predicate is used in multiple disjuncts less space is required.

Begin End Key

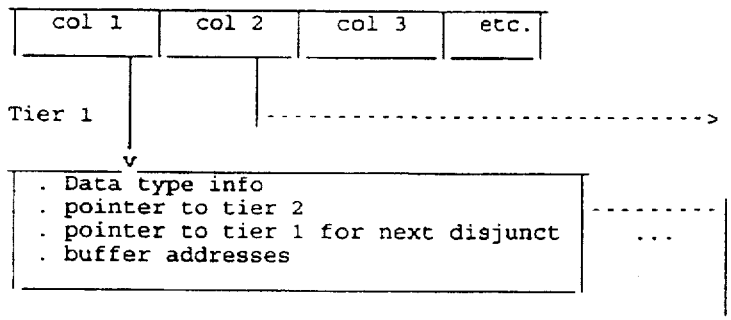

General Expression Method

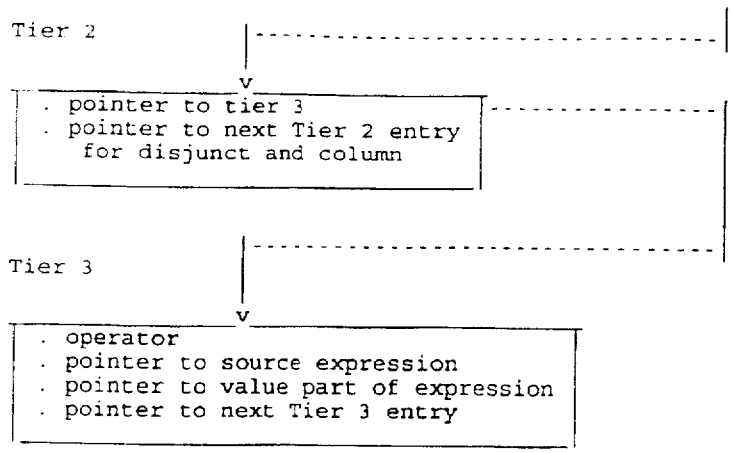

3.4.11 Cross Products with Leading Ranges

Cross products in parallel are materialized by having the data for an outer partition combined with all the data from each table in the cross product. If an inner table had a leading range on it we would have to look through the entire range for each cross product.

An alternative way to look at this is to do a complete cross product using the entire outer table each time. Normally the table that has esps started for each partition is the outer table. However, in this case we want the outer table to have the cross product and the table that we are joining the cross product to will be the one that drives the esp assignment. In this way we only have to apply the complete cross product to a single partition of the large fact table.

The compiler will do a test costing of both ways of doing this and choose the cheaper.

3.4.12 Explain

The predicates for each disjunct will be shown. The begin/end format will not be used, instead the disjunct and the expressions valid in that disjunct will be displayed.

3.4.13 Interaction with Current OR Optimization

The two types of OR optimization will not be mixed initially. Each will be costed independently and the cheapest will be chosen.

General Expression Method

Eventually we want to integrate the two. The way we expect this to be done is by costing all the possible disjuncts for each index, and choosing the cheapest index for each disjunct. Then each index will have a set of disjuncts associated with it. Each index will then be a GEM index. The creation of the ISFALSE expressions is a little more complex than it was in the way this was previously done.

The current OR optimization would choose a different scan for each disjunct. It would only choose OR optimization if the predicates were already in disjunctive normal form. The revised OR optimization would not require the predicates to be stated in disjunctive normal form, since the new design creates disjunctive normal form. In addition there will only be one scan per index.

3.5 Design Assumptions

* Optimizer will need to ensure that the key columns are part of the select list.

Need to talk about:
  -- locking and dm^key position
  -- costing
  -- predicate formats(rarity of non-overlapping ranges for the same column)
  -- versioning

3.6 Design Restrictions

* The GEM optimization will not apply to queries where there is a disjunctive OR on a non-key column. For example, for a table T(A,B,C) where the key is (A,B), the following query cannot use this optimization:

(A BETWEEN 1 AND 100 AND B = 10) OR
    B IN (1,2,3)                     OR
    C = 100

Because the predicate on C will result in a full table scan for values of a non-key column.

* All data scans will be through the same index, unlike OR optimization where different scans through the table can be via distinct indexes. This feature however allows for support of DP2 aggregates and GROUP BY in queries where GEM optimization is used in place of OR optimization.

General Expression Method

4.0 SPECIAL CONSIDERATIONS

Need to talk about:
-- performance and requirements which need to be met.
-- versioning and backward compatibility with downrev systems.
-- any (if any) issues with parallelism?? concurrency? locking?

5.0 CONSIDERATIONS FOR FUTURE ENHANCEMENTS

Once GEM has been fully implemented and tested, moving the implementation to the disk process layer should be considered (refer to Section 9.0). This enhancement will allow for an even better performance by pushing key building routines and algorithm for retrieving values from ranges down to DP2.

In the future a more effective use of VSBB may be considered as an added advantage of the DP2 implementation.

6.0 TESTING

This section should describe any special testing issues, as well as a general outline of testing required to ensure a quality implementation. This information should not duplicate the Unit Test Plan, but instead give a higher level abstraction and point out any special system level testing concerns.

7.0 OPEN ISSUES

* How will key predicates and joins containing column values be handled? Can they be handled?

Example:   T1.A = T2.A   OR
               T1.A = T2.B

* What are the special considerations for ordered columns and columns which have collations defined on them?

* How will NULL predicates be handled?

* If key columns are in different order (some are ascending and some descending), expression evaluator will need to fiddle with the EXT^FIRST^KEY^TYPE flag accordingly in cases of overflow and underflow. Currently this flag gets set statically, but it will need to change dynamically for GEM.

* Depending on how GEM-tree information is stored and retrieved, a SORT may be necessary (i.e. if key column is descending and GEM-tree keys are being retrieved in ascending order, the General Expression Method rertrieved rows will need to be sorted). Must look into optimizing this if possible.

8.0 CLOSED ISSUES

* Multi-Value Predicates (MVPs) will always be transformed to their disjunctive normal form, whether they are in the terminating column(s) or not. This is so that we don't have to teach the duplicate elimination routine to learn about MVPs and collapsing such ranges.

* Can data retrieved from the sparse algorithm not be analyzed and instead simply move key values needed to key buffers?? Downside is that some rows maybe retrieved more than once.

NO. Retrieved data needs to be analyzed so it can be decided which predicate to associate with the current key being built. This will not be necessary if the entire predicate will be applied to the retrieved rows at the executor layer, but then the number of rows handled could be significantly more.

* Will LIKE always be transformed to a range and what in cases it cannot be (e.g. wild cards)?

In possible cases where the wild card is not in the leading portion of a constant like pattern, and no collations are specified for that predicate, the predicate will be transformed into a range. In all other cases (patterns stored in host variables or params or when collations are used), the like predicate will become a non-key predicate.

* NOT predicates will be transformed into non-key predicates.

* How will non-key predicates be handled?

It was originally planned to associate non-key predicates to key predicates via a tag or identifier and to dynamically link them together as needed when ranges were collapsed. A new design is under consideration now. The non-key predicates and key predicates will be generated and will be sent to DP2 in their entirety and will be evaluated to eliminate unnecessary rows. There is no longer a need to associate non-key predicates with a given key predicate set.

* There are no issues with locking and supporting DP2 aggregates.

* How can predicates be combined together dynamically? If use of Fast Expressions is necessary, optimizer will need logic to estimate size of expressions such that we have a work around for those who get too big.

In the first phase of this project, we will use fast expressions and will send the entire expression down to the DP2 layer. In General Expression Method future, we may want to consider alternatives to optimize this process.

9.0 DESIGN ALTERNATIVES

Initially, there was a plan to implement this new access method in the DP2 layer (for a detail of the design please refer to [5]). This plan was reconsidered and the design has since changed for the following reasons:

* With the DP2 approach, we could only support BROWSE access within the given timeframe and thus could not extend this new access method to include UPDATE and DELETE DML statements. With the new design, DM^KEYPOSITION can be used to mimic the desired behaviour of materializing existing rows within a range and will allow a work around for the locking issues.

* Because of a time constraint to make this enhancement available by April 1995, it was decided to reduce the involvment of different components and keep the changes centralized in the SQL compiler and executor area. The other design will need support from DP2 and FS2 as well and will result in DP2 introducing a new dialect.

* Although the performance gains of the new design will not be as significant as the later, it will still be noticable gains compared to current behaviour.

General Expression Method

10.0 APPENDIX A

Suppose we have a table T(A,B,C,D) with key columns (A,B,C), with the following contents:

```
A       B       C       D
------  ------  ------  ------
     1       5       1       1
     1       7       1       1
     1      10       1       1
     1      10       7       1
     1      11       1       1
     1      15       1       1
     1      25       1       1
     1      28       1       1
     1      28       3       1
     3      10       7       1
     3      12       7       1
     3      12      28       1
     3      15      28       1
     4      10      38       1
     4      15      28       1
     4      17      38       1
     4      25      18       1
     4      25      28       1
     4      25      38       1
     9      12      10       1
     9      12      15       1
...
other values with A >= 9
...
```

Consider the predicate example given in section 3.3 (here shown in the form suggested by the GEM-tree):

```
A >= 1 and < 65 AND B = 10 AND C < 30                    OR
A >= 65 and < 100 AND B = 10)                            OR
A >= 65 and < 100 AND B > 10 and <= 20 AND C >= 30       OR
A = 100 AND B > = 10                                     OR
A > 100 and < = 120 AND B >= 10 and <= 20 AND C >= 30    OR
A = 200 AND B >= 10
```

We will show in detail the use of the sparse and dense algorithms. Please note that this is example merely illustrates the algorithm and doesn't necessarily exhibit the performance gains from this new access method.

10.1 Sparse Algorithm

Here we show the use of the sparse algorithm.

General Expression Method

1. A subset will be started for table T, with the first key from the GEM tree describing the above expression. The random flag of the DM block will be set so to allow random access to the file.

At cursor open time, after building the GEM-tree, we traverse it and get initial key values. At first fetch, we retrieve the first row:

```
             A    B    C
             ---  ---  ---
   begin-key  1   10   lo    --->  1   10   1   1
   *end-key   1   10   30
   ```

The columns on the left signify the key set up for the DM^START and DM^GET call and the columns on the right are the result of the DM^GET call. A * next to begin-key means the DM^AFTER flag is set, and one next to the end-key signifies that DM^BEFORE is set.

Because there is a range specified on the last key column, we will continue to retrieve rows on later fetches until all values in the range are exhausted and we get an EOF:

```
   --->  1   10   7   1
   --->  EOF
   ```

Note that its not necessary to find the next value in the range for column C.

2. With EOF, we know the range on C has been exhausted. We traverse the GEM-tree some more to find the next key range. We see that there are no more intervals for C for the current values of A and B. We backtrack to B, and see that there are no more for B either. So, we backtrack to A.

Here we use the sparse algorithm to find the next value of A in the interval (1,65). We refer to this as <u>probing for column A</u>.

On a separate DM block (which lacks any base table predicates), we start a subset as shown below and retrieve a row:

```
             A    B    C
             ---  ---  ---
   * B-key    1   hi   hi    --->  3   10   7   1
   * E-key   65   lo   lo
   ```

Note that we set the DM^AFTER flag to avoid retrieving the value A = 1. Note that we set DM^BEFORE, and use lo, lo for B and C in the end key, because the ending predicate is A < 65. (Were it A <= 65, we would not set DM^BEFORE, and we would use hi, hi for B and C in the end key.)

3. We use the value 3 as the current value for A, and traverse on to column B. The only matching interval is [10,10]. We traverse on to column C. We find the matching interval [lo,30).

General Expression Method

So, we start a new subset using these values, and do a DM^GET:

```
            A      B       C
           ---    ----    ----
   B-key   3      10      1o     ---> 3  10  7  1
 * E-key   3      10      30
```

Note that we happened to retrieve the same row a second time. In general, though, the row retrieved when probing for A will not satisfy the original predicate. (For example, if the row (3,9,10,10) were present in the table, we would have retrieved it when probing instead.) The point of the probe phase is to find the next value of A efficiently, not to do a table scan until we find the next qualifying row. In general, we would expect many data blocks between the row retrieved while probing and the row retrieved when fetching.

4. On the next fetch, we get EOF, and we traverse the GEM-tree again, in the same manner.

10.2 Dense Algorithm

Here we go over the same example again, this time using the dense algorithm.

1. At cursor open and first fetch time, we start our first subset and retrieve the first row as before:

```
            A      B       C
           ---    ----    ----
   B-key   1      10      1o     ---> 1  10  1  1
 * E-key   1      10      30
```

2. On the next fetch, we get EOF. So, we traverse the GEM-tree some more to get the next key range. As before, we backtrack to column A. We find the next value of column A by adding one to the current value (obtaining the value 2). We then traverse to columns B and C as before, and obtain a new subset. Returning to fetch processing, we do a DM^KEYPOSITION and a DM^GET, obtaining EOF:

```
            A      B       C
           ---    ----    ----
   B-key   2      10      1o     ---> EOF
 * E-key   2      10      30
```

3. Because there were no matches, we traverse the GEM-tree some more. We try again using 3 for A:

```
                                        General Expression Method
                              81
                 A      B      C
                -----  -----  -----
         B-key   3      10     10    ---> 3  10  7  1
       * E-key   3      10     30
```

4. On the next fetch, we once again obtain EOF, and go through GEM-tree traversal again. Future fetches follow similar processing.

CONTENTS 1.0 INTRODUCTION . . . . . . . . . . . . . . . . . . . . . . . . . . . . . 1
  1.1 Document History . . . . . . . . . . . . . . . . . . . . . . . . . 1
  1.2 Related Documents . . . . . . . . . . . . . . . . . . . . . . . . 1
2.0 SUMMARY OF EXTERNALS . . . . . . . . . . . . . . . . . . . . . . . . . 1
3.0 SUMMARY OF INTERNAL DESIGN . . . . . . . . . . . . . . . . . . . . . . 2
  3.1 Design Overview . . . . . . . . . . . . . . . . . . . . . . . . . 2
  3.2 Design Objectives . . . . . . . . . . . . . . . . . . . . . . . . 2
  3.3 Run Time Processing . . . . . . . . . . . . . . . . . . . . . . . 2
    3.3.1 GEM-tree Construction . . . . . . . . . . . . . . . . . . . . 3
      3.3.1.1 Definitions - GEM-tree, Predicate List . . . . . . 4
      3.3.1.2 Stage 1 . . . . . . . . . . . . . . . . . . . . . . 5
      3.3.1.3 Stage 2 . . . . . . . . . . . . . . . . . . . . . . 8
      3.3.1.4 An Example . . . . . . . . . . . . . . . . . . . . . 9
    3.3.2 GEM-tree Traversal . . . . . . . . . . . . . . . . . . . . . 12
      3.3.2.1 The GEM-tree Traversal Algorithm . . . . . . . . . 12
      3.3.2.2 Dense Algorithm . . . . . . . . . . . . . . . . . . 16
      3.3.2.3 Sparse Algorithm . . . . . . . . . . . . . . . . . 17
      3.3.2.4 An Example . . . . . . . . . . . . . . . . . . . . 18
    3.3.3 Descending Keys . . . . . . . . . . . . . . . . . . . . . . 22
    3.3.4 Proof of Correctness . . . . . . . . . . . . . . . . . . . . 23
    3.3.5 Further Refinement . . . . . . . . . . . . . . . . . . . . . 25
      3.3.5.1 Disjuncts Lacking Predicates on Rightmost Keys . 25
      3.3.5.2 Leverage from Sparse Algorithm . . . . . . . . . . 26
    3.3.6 Non-Key Predicates . . . . . . . . . . . . . . . . . . . . . 26
  3.4 Optimizer Processing . . . . . . . . . . . . . . . . . . . . . . . 26
    3.4.1 Use of Predicate Lists in the Optimizer . . . . . . . 27
    3.4.2 Handling of Range Predicates in the Optimizer . . . 28
    3.4.3 Building the Path Pred Lists . . . . . . . . . . . . . 28
    3.4.4 Choosing Predicates for an Index . . . . . . . . . . . 29
    3.4.5 Multiple Ranges and Single Column OR Lists in a Key 29
    3.4.6 Handling Disjunctions in the Optimizer . . . . . . . 29
    3.4.7 Implementation - Choosing Index Predicates . . . . . 30
    3.4.8 Costing . . . . . . . . . . . . . . . . . . . . . . . . . . . 31
    3.4.9 Use of Search Key Array . . . . . . . . . . . . . . . . 32
    3.4.10 Interface with the Generator . . . . . . . . . . . . . 32
    3.4.11 Cross Products with Leading Ranges . . . . . . . . . 33
    3.4.12 Explain . . . . . . . . . . . . . . . . . . . . . . . . . . 33
    3.4.13 Interaction with Current OR Optimization . . . . . 33
  3.5 Design Assumptions . . . . . . . . . . . . . . . . . . . . . . . . 34
  3.6 Design Restrictions . . . . . . . . . . . . . . . . . . . . . . . 34
4.0 SPECIAL CONSIDERATIONS . . . . . . . . . . . . . . . . . . . . . . . . 35
5.0 CONSIDERATIONS FOR FUTURE ENHANCEMENTS . . . . . . . . . . . . . . . 35
6.0 TESTING . . . . . . . . . . . . . . . . . . . . . . . . . . . . . . . . 35
7.0 OPEN ISSUES . . . . . . . . . . . . . . . . . . . . . . . . . . . . . . 35
8.0 CLOSED ISSUES . . . . . . . . . . . . . . . . . . . . . . . . . . . . . 36
9.0 DESIGN ALTERNATIVES . . . . . . . . . . . . . . . . . . . . . . . . . 37
10.0 APPENDIX A . . . . . . . . . . . . . . . . . . . . . . . . . . . . . . 38
  10.1 Sparse Algorithm . . . . . . . . . . . . . . . . . . . . . . . . . 38
  10.2 Dense Algorithm . . . . . . . . . . . . . . . . . . . . . . . . . 40

What is claimed is:

1. A method of constructing search keys for searching a multi-column table in a database using search keys constructed in accordance with a search query specifying predicate values corresponding to values of preselected columns of the table, the search keys including names of the preselected columns of the table and associated predicate values, said method comprising the steps of:

(a) evaluating the predicate values corresponding to the values of the preselected columns of the table specified by the search query;

(b) for each predicate value specified as a range of values, assigning equivalent range values to the corresponding preselected column;

(c) for each predicate value specified as an IN list of values, assigning equivalent values to the corresponding preselected column;

(d) for each unspecified predicate value, assigning a range of values to the corresponding preselected column; and (e) using the assigned equivalent values from steps (b)–(d) to construct individual search keys for searching the table;

wherein a search query includes a plurality of disjuncts; and wherein said step (a) of evaluating includes the step of assigning a unique disjunct number to each of said plurality of disjuncts.

2. The method of claim 1 wherein said step of assigning disjunct numbers includes the step of assigning an individual disjunct number to an IN list predicate.

3. The method of claim 1 wherein said step (a) of evaluating includes the steps of associating predicates to clusters and associating clusters to disjunct numbers.

4. A method of constructing search keys for searching a multi-column table in a database using search keys constructed in accordance with a search query specifying predicate values corresponding to values of preselected columns of the table, the search keys including names of the preselected columns of the table and associated predicate values, said method comprising the steps of:

(a) evaluating the predicate values corresponding to the values of the preselected columns of the table specified by the search query;

(b) for each predicate value specified as a range of values, assigning equivalent range values to the corresponding preselected column;

(c) for each predicate value specified as an IN list of values, assigning equivalent values to the corresponding preselected column;

(d) for each unspecified predicate value, assigning a range of values to the corresponding preselected column; and (e) using the assigned equivalent values from steps (b)–(d) to construct individual search keys for searching the table;

wherein said equivalent range values assigned in step (b) are specified as the lo and hi values of the corresponding preselected column.

5. A method of constructing search keys for searching a multi-column table in a database using search keys constructed in accordance with a search query specifying predicate values corresponding to values of preselected columns of the table, the search keys including names of the preselected columns of the table and associated predicate values, said method comprising the steps of:

(a) evaluating the predicate values corresponding to the values of the preselected columns of the table specified by the search query;

(b) for each predicate value specified as a range of values, assigning equivalent range values to the corresponding preselected column;

(c) for each predicate value specified as an IN list of values, assigning equivalent values to the corresponding preselected column;

(d) for each unspecified predicate value, assigning a range of values to the corresponding preselected column; and (e) using the assigned equivalent values from steps (b)–(d) to construct individual search keys for searching the table;

wherein said step (e) of using includes the step of eliminating conflicting predicate values from the same column to reduce the number of potential predicate values for searching that column.

6. A method of constructing search keys for searching a multi-column table in a database using search keys constructed in accordance with a search query specifying predicate values corresponding to values of preselected columns of the table, the search keys including names of the preselected columns of the table and associated predicate values, said method comprising the steps of:

(a) evaluating the predicate values corresponding to the values of the preselected columns of the table specified by the search query;

(b) for each predicate value specified as a range of values, assigning equivalent range values to the corresponding preselected column;

(c) for each predicate value specified as an IN list of values, assigning equivalent values to the corresponding preselected column;

(d) for each unspecified predicate value, assigning a range of values to the corresponding preselected column; and (e) using the assigned equivalent values from steps (b)–(d) to construct individual search keys for searching the table;

wherein said step (e) of using includes the step of eliminating redundant values specified by the disjuncts to minimize the number of search keys required to fulfill the search query.

7. A computer system for storing and providing user access to data in stored database objects, said system comprising:

a memory for storing said database objects;

a communications interface through which user database queries are relayed to said computer system from a user workstation, and through which query results from said computer system are made available to the user workstation;

a processor for controlling interactions between said memory and said communications interface in response to a search query received from a user workstation and specifying predicate values corresponding to values of preselected columns of a multi-column table;

a computer program for causing said processor to construct individual search keys in accordance with a search query specifying predicate values corresponding to values of preselected columns of the table, the search keys including names of the preselected columns of the table and associated predicate values, said computer program including a first procedure for evaluating the predicate values specified by the search query;

a second procedure for assigning equivalent range values for each predicate value specified in the search query as a range of values, to the corresponding preselected column;

a third procedure for assigning equivalent values for each predicate value specified in the search query as an IN list of values, to the corresponding preselected column;

a fourth procedure for assigning a range of values to the corresponding preselected column for each unspecified predicate value; and a fifth procedure for constructing individual search keys from the equivalent values assigned by the first through fourth procedures;

wherein a search query includes a plurality of disjuncts; and wherein said first procedure causes said processor to assign a unique disjunct number to each of the plurality of disjuncts in the search query.

8. The system of claim 7 wherein the first procedure causes said processor to assign an individual disjunct number to an IN list predicate.

9. The system of claim 7 wherein the first procedure causes said processor to associate predicates to clusters and associate clusters to disjunct numbers.

10. A computer system for storing and providing user access to data in stored database objects, said system comprising:

a memory for storing said database objects;

a communications interface through which user database queries are relayed to said computer system from a user workstation, and through which query results from said computer system are made available to the user workstation;

a processor for controlling interactions between said memory and said communications interface in response to a search query received from a user workstation and specifying predicate values corresponding to values of preselected columns of a multi-column table;

a computer program for causing said processor to construct individual search keys in accordance with a search query specifying predicate values corresponding to values of preselected columns of the table, the search keys including names of the preselected columns of the table and associated predicate values, said computer program including a first procedure for evaluating the predicate values specified by the search query;

a second procedure for assigning equivalent range values for each predicate value specified in the search query as a range of values, to the corresponding preselected column;

a third procedure for assigning equivalent values for each predicate value specified in the search query as an IN list of values, to the corresponding preselected column;

a fourth procedure for assigning a range of values to the corresponding preselected column for each unspecified predicate value; and a fifth procedure for constructing individual search keys from the equivalent values assigned by the first through fourth procedures;

wherein the equivalent range values assigned by the processor in response to the second procedure are specified as the lo and hi values of the corresponding predicate column.

11. A computer system for storing and providing user access to data in stored database objects, said system comprising:

a memory for storing said database objects;

a communications interface through which user database queries are relayed to said computer system from a user workstation, and through which query results from said computer system are made available to the user workstation;

a processor for controlling interactions between said memory and said communications interface in response to a search query received from a user workstation and specifying predicate values corresponding to values of preselected columns of a multi-column table;

a computer program for causing said processor to construct individual search keys in accordance with a search query specifying predicate values corresponding to values of preselected columns of the table, the search keys including names of the preselected columns of the table and associated predicate values, said computer program including a first procedure for evaluating the predicate values specified by the search query;

a second procedure for assigning equivalent range values for each predicate value specified in the search query as a range of values, to the corresponding preselected column;

a third procedure for assigning equivalent values for each predicate value specified in the search query as an IN list of values, to the corresponding preselected column;

a fourth procedure for assigning a range of values to the corresponding preselected column for each unspecified predicate value; and a fifth procedure for constructing individual search keys from the equivalent values assigned by the first through fourth procedures;

wherein the fifth procedure causes said processor to eliminate conflicting predicate values from the same column to reduce the number of potential predicate values for searching that column.

12. A computer system for storing and providing user access to data in stored database objects, said system comprising:

a memory for storing said database objects;

a communications interface through which user database queries are relayed to said computer system from a user workstation, and through which query results from said computer system are made available to the user workstation;

a processor for controlling interactions between said memory and said communications interface in response to a search query received from a user workstation and specifying predicate values corresponding to values of preselected columns of a multi-column table;

a computer program for causing said processor to construct individual search keys in accordance with a search query specifying predicate values corresponding to values of preselected columns of the table, the search keys including names of the preselected columns of the table and associated predicate values, said computer program including a first procedure for evaluating the predicate values specified by the search query;

a second procedure for assigning equivalent range values for each predicate value specified in the search query as a range of values, to the corresponding preselected column;

a third procedure for assigning equivalent values for each predicate value specified in the search query as an IN list of values, to the corresponding preselected column;

a fourth procedure for assigning a range of values to the corresponding preselected column for each unspecified predicate value; and a fifth procedure for constructing individual search keys from the equivalent values assigned by the first through fourth procedures;

The system of claim 8 wherein the fifth procedure causes said processor to eliminate redundant values specified by the disjuncts in order to minimize the number of search keys required to fulfill the search query.

13. A computer program product comprising a computer usable medium having computer readable code embodied therein for constructing individual search keys for searching a multi-column table in a database, the search keys being constructed in accordance with a search query specifying predicate values corresponding to values of preselected columns of the table, the search keys including names of the preselected columns of the table and associated predicate values, the computer program product comprising:

first computer readable program code devices configured to cause a computer to evaluate the predicate values specified by the search query and corresponding to the values of the preselected columns of the table;

second computer readable program code devices configured to cause a computer to assign, for each predicate value specified as a range of values, equivalent range values to the corresponding preselected column;

third computer readable program code devices configured to cause a computer to assign, for each predicate value specified as an IN list of values, equivalent values to the corresponding preselected column;

fourth computer readable program code devices configured to cause a computer to assign, for each unspecified predicate value, a range of values to the corresponding preselected column; and fifth computer readable program code devices configured to cause a computer to use said equivalent values to construct individual search keys;

wherein a search query includes a plurality of disjuncts; and wherein said first computer readable program code devices are configured to cause a computer to assign a unique disjunct number to each of said plurality of disjuncts.

14. The computer program product of claim 13 wherein the computer is caused to assign an individual disjunct number to an IN list predicate.

15. The computer program product of claim 13 wherein said first computer readable program code devices are configured to cause the computer to associate predicates to clusters and clusters to disjunct numbers.

16. A computer program product comprising a computer usable medium having computer readable code embodied therein for constructing individual search keys for searching a multi-column table in a database, the search keys being constructed in accordance with a search query specifying predicate values corresponding to values of preselected columns of the table, the search keys including names of the preselected columns of the table and associated predicate values, the computer program product comprising:

first computer readable program code devices configured to cause a computer to evaluate the predicate values specified by the search query and corresponding to the values of the preselected columns of the table;

second computer readable program code devices configured to cause a computer to assign, for each predicate value specified as a range of values, equivalent range values to the corresponding preselected column;

third computer readable program code devices configured to cause a computer to assign, for each predicate value specified as an IN list of values, equivalent values to the corresponding preselected column;

fourth computer readable program code devices configured to cause a computer to assign, for each unspecified predicate value, a range of values to the corresponding preselected column; and fifth computer readable program code devices configured to cause a computer to use said equivalent values to construct individual search keys;

wherein the equivalent range values assigned by the computer in response to said second computer readable program code devices are specified as the lo and hi values of the corresponding predicate column.

17. A computer program product comprising a computer usable medium having computer readable code embodied therein for constructing individual search keys for searching a multi-column table in a database, the search keys being constructed in accordance with a search query specifying predicate values corresponding to values of preselected columns of the table, the search keys including names of the preselected columns of the table and associated predicate values, the computer program product comprising:

first computer readable program code devices configured to cause a computer to evaluate the predicate values specified by the search query and corresponding to the values of the preselected columns of the table;

second computer readable program code devices configured to cause a computer to assign, for each predicate value specified as a range of values, equivalent range values to the corresponding preselected column;

third computer readable program code devices configured to cause a computer to assign, for each predicate value specified as an IN list of values, equivalent values to the corresponding preselected column;

fourth computer readable program code devices configured to cause a computer to assign, for each unspecified predicate value, a range of values to the corresponding preselected column; and fifth computer readable program code devices configured to cause a computer to use said equivalent values to construct individual search keys;

wherein the fifth computer readable program code devices are additionally configured to cause the computer to eliminate conflicting predicate values from the same column to reduce the number of potential predicate values for searching that column.

18. A computer program product comprising a computer usable medium having computer readable code embodied therein for constructing individual search keys for searching a multi-column table in a database, the search keys being constructed in accordance with a search query specifying predicate values corresponding to values of preselected columns of the table, the search keys including names of the preselected columns of the table and associated predicate values, the computer program product comprising:

first computer readable program code devices configured to cause a computer to evaluate the predicate values specified by the search query and corresponding to the values of the preselected columns of the table;

second computer readable program code devices configured to cause a computer to assign, for each predicate value specified as a range of values, equivalent range values to the corresponding preselected column;

third computer readable program code devices configured to cause a computer to assign, for each predicate value specified as an IN list of values, equivalent values to the corresponding preselected column;

fourth computer readable program code devices configured to cause a computer to assign, for each unspecified predicate value, a range of values to the corresponding preselected column; and fifth computer readable program code devices configured to cause a computer to use said equivalent values to construct individual search keys;

wherein said fifth computer readable program code devices are additionally configured to cause the computer to eliminate redundant values specified by the disjuncts to minimize the number of search keys required to fulfill the search query.

* * * * *

UNITED STATES PATENT AND TRADEMARK OFFICE
CERTIFICATE OF CORRECTION

PATENT NO.   : 5,778,354
DATED         : July 7, 1998
INVENTOR(S)  : Harry A. Leslie et al.

It is certified that error appears in the above-identified patent and that said Letters Patent is hereby corrected as shown below:

<u>Column 127,</u>
Line 1, cancel "The system of claim 8".

Signed and Sealed this

First Day of April, 2003

JAMES E. ROGAN
*Director of the United States Patent and Trademark Office*